United States Patent
Kim et al.

(10) Patent No.: US 10,397,816 B2
(45) Date of Patent: Aug. 27, 2019

(54) WIRELESS LOCAL AREA NETWORK THROUGHPUT ESTIMATION

(71) Applicant: QUALCOMM Incorporated, San Diego, CA (US)

(72) Inventors: Youhan Kim, San Jose, CA (US); Zhanfeng Jia, Belmont, CA (US); Srinivas Katar, Fremont, CA (US); Rahul Malik, San Diego, CA (US); Jay Kumar Sundararajan, San Diego, CA (US); Arnaud Meylan, San Diego, CA (US); Ning Zhang, Saratoga, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/962,530

(22) Filed: Dec. 8, 2015

(65) Prior Publication Data

US 2016/0165475 A1    Jun. 9, 2016

Related U.S. Application Data

(60) Provisional application No. 62/089,726, filed on Dec. 9, 2014.

(51) Int. Cl.
  *H04W 24/10*    (2009.01)
  *H04W 48/16*    (2009.01)
  (Continued)

(52) U.S. Cl.
  CPC ........... *H04W 24/10* (2013.01); *H04W 28/16* (2013.01); *H04W 48/16* (2013.01); *H04W 48/12* (2013.01); *H04W 48/20* (2013.01)

(58) Field of Classification Search
  CPC ........... H04Q 11/0478; H04L 12/5602; H04L 2012/5636; H04L 12/2697; H04L 43/026
  See application file for complete search history.

(56) References Cited

U.S. PATENT DOCUMENTS

| 7,477,602 B2* | 1/2009 | Ling | H04L 41/147 370/232 |
| 8,400,997 B2* | 3/2013 | Pera | H04W 74/06 370/329 |

(Continued)

OTHER PUBLICATIONS

ISA/EPO, International Search Report and Written Opinion of the International Searching Authority, Int'l Appl. No. PCT/US2015/064788, dated Mar. 9, 2016, European Patent Office, Rijswijk, NL, 10 pgs.

*Primary Examiner* — Gbemileke J Onamuti
*Assistant Examiner* — Sanjay K Dewan
(74) *Attorney, Agent, or Firm* — Holland & Hart LLP

(57) ABSTRACT

Methods, apparatus, and computer-readable media for wireless communication may involve techniques for throughput estimation. An expected air time parameter may be used as a parameter for estimating throughput. The expected air time parameter may be indicative of an estimated air time fraction obtainable for communications using an access point (AP), for example, between a wireless station (STA) and the AP. Either the expected air time parameter or an estimated air time fraction determined (e.g., calculated) from the expected air time parameter may be transmitted from the AP to the STA (or other communication device) to allow the STA (or other communication device) to determine an estimated throughput for communications using the AP.

20 Claims, 21 Drawing Sheets

(51) Int. Cl.
    *H04W 28/16*    (2009.01)
    *H04W 48/12*    (2009.01)
    *H04W 48/20*    (2009.01)

(56) References Cited

U.S. PATENT DOCUMENTS

| | | | | |
|---|---|---|---|---|
| 8,665,908 | B1* | 3/2014 | Zhang | H04W 24/02 |
| | | | | 370/338 |
| 8,861,543 | B2* | 10/2014 | Sato | H04L 1/0003 |
| | | | | 370/252 |
| 8,902,863 | B2* | 12/2014 | Pera | H04W 74/06 |
| | | | | 370/336 |
| 9,007,953 | B1* | 4/2015 | Broyles | H04L 43/062 |
| | | | | 370/253 |
| 9,497,740 | B2* | 11/2016 | Gupta | H04W 52/0225 |
| 9,883,418 | B2* | 1/2018 | Kim | H04W 28/0236 |
| 2005/0096021 | A1* | 5/2005 | Benco | H04M 3/436 |
| | | | | 455/415 |
| 2005/0220035 | A1* | 10/2005 | Ling | H04L 41/147 |
| | | | | 370/252 |
| 2007/0086353 | A1* | 4/2007 | Gefflaut | H04L 1/002 |
| | | | | 370/252 |
| 2009/0257361 | A1* | 10/2009 | Deshpande | H04L 43/50 |
| | | | | 370/252 |
| 2009/0264123 | A1 | 10/2009 | Agashe et al. | |
| 2010/0301992 | A1* | 12/2010 | Chandra | H04W 16/14 |
| | | | | 340/5.1 |
| 2011/0211484 | A1* | 9/2011 | Behroozi | H04L 43/50 |
| | | | | 370/252 |
| 2011/0299422 | A1* | 12/2011 | Kim | H04W 48/16 |
| | | | | 370/253 |
| 2013/0065633 | A1 | 3/2013 | Sridhara et al. | |
| 2013/0272159 | A1* | 10/2013 | Pang | H04L 43/026 |
| | | | | 370/253 |
| 2013/0301411 | A1* | 11/2013 | Yoshida | H04W 24/08 |
| | | | | 370/231 |
| 2014/0078970 | A1* | 3/2014 | Guo | H04W 72/005 |
| | | | | 370/329 |
| 2014/0105058 | A1* | 4/2014 | Hu | H04W 24/08 |
| | | | | 370/253 |
| 2015/0257116 | A1* | 9/2015 | Frantti | H04W 60/06 |
| | | | | 370/253 |
| 2016/0007359 | A1* | 1/2016 | Kim | H04W 28/0205 |
| | | | | 370/232 |
| 2016/0073287 | A1* | 3/2016 | Himayat | H04W 48/18 |
| | | | | 370/236 |
| 2016/0183281 | A1* | 6/2016 | Yeh | H04W 28/24 |
| | | | | 370/332 |
| 2016/0338068 | A1* | 11/2016 | Cheng | H04W 28/08 |
| 2017/0135018 | A1* | 5/2017 | Amini | H04W 36/30 |
| 2017/0251401 | A1* | 8/2017 | Comstock | H04W 28/08 |
| 2018/0020379 | A1* | 1/2018 | Skarp | H04B 17/318 |

* cited by examiner

| Access Category | Number of Active Stations | Channel Access Latency | Random Access Delay | Data Format | BA Window Size | Data PPDU Duration Target |
|---|---|---|---|---|---|---|
| 605-a | 630 | 635 | 640 | 615-a | 620-a | 625-a |

WIRELESS LOCAL AREA NETWORK THROUGHPUT ESTIMATION

CROSS REFERENCES

The present Application for Patent claims priority to U.S. Provisional Patent Application No. 62/089,726 by Kim et al., entitled "Wireless Local Area Network Throughput Estimation," filed Dec. 9, 2014, assigned to the assignee hereof, and expressly incorporated by reference herein.

BACKGROUND

Field of the Disclosure

The present disclosure, for example, relates to wireless communication systems, and more particularly to throughput estimation in a wireless local area network.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations or access points, each simultaneously supporting communication for multiple mobile devices. Access points may communicate with mobile devices on downstream and upstream links, and each access point has a coverage range.

For example, a wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

Throughput estimation may be used to determine whether a STA should use a particular AP. However, existing methods of estimating throughput are somewhat inaccurate because they may rely on channel utilization parameters, for example. Using channel utilization as a parameter for throughput estimation may lead to a misleading estimation because such estimation may not truly reflect the utilization a new STA joining the network may obtain.

SUMMARY

The described features generally relate to one or more systems, methods, or apparatuses for wireless communications. More particularly, the described features relate to techniques for throughput estimation. An expected air time parameter may be used as a parameter for estimating throughput. The expected air time parameter may be indicative of an estimated air time fraction obtainable for communications using an access point (AP), for example, between a wireless station (STA) and the AP. Either the expected air time parameter or an estimated air time fraction determined (e.g., calculated) from the expected air time parameter may be transmitted from the AP to a communication device (e.g., the STA) to allow the communication device (e.g., the STA) to determine an estimated throughput for communications with the AP.

A method for wireless communications is described. The method may involve receiving, by a communication device, an expected air time parameter for an access point. Whether to use the access point for communications may be determined based at least in part on the expected air time parameter.

Determining whether to use the access point may involve determining, based at least in part on the expected air time parameter, whether to perform an action from the group consisting of: triggering association with the access point, triggering roaming to the access point, and triggering steering of traffic to the access point.

Receiving the expected air time parameter for the access point may involve receiving a wireless beacon broadcast by the access point. The wireless beacon may include the expected air time parameter. The expected air time parameter may be located in an estimated service parameters portion of the wireless beacon.

The method also may involve transmitting the expected air time parameter to a node other than the access point.

Determining whether to use the access point may involve determining, based at least in part on the expected air time parameter, whether to use the access point for communications between a wireless station and the access point.

The expected air time parameter may be indicative of an estimated air time fraction obtainable for communications using the access point.

The method also may involve determining, based at least in part on the expected air time parameter, an estimated air time fraction obtainable for communications using the access point.

The expected air time parameter may be at least one parameter from the group consisting of: a number of stations actively being serviced by the access point, an average channel access latency, and a physical protocol data unit transmission time.

Determining whether to use the access point may involve determining whether to steer traffic to a first network comprising the access point from a second network.

Receiving the expected air time parameter for the access point may involve receiving a plurality of expected air time parameters for a corresponding plurality of access points. In such case, determining whether to use the access point may involve selecting one of the plurality of access points based at least in part on the expected air time parameters for the plurality of access points. Selecting one of the plurality of access points for association may be performed as part of a roaming operation.

The method also may involve determining an estimated throughput for each of the plurality of access points, and comparing the estimated throughputs of the plurality of access points. In such a case, selecting one of the plurality of access points may be based at least in part on a result of the comparing.

An apparatus for wireless communications is described. The apparatus may include: means for receiving, by a communication device, an expected air time parameter for an access point; and means for determining whether to use the access point for communications based at least in part on the expected air time parameter. The apparatus may include these or other elements configured to carry out various operations of the methods described above and herein.

Another apparatus for wireless communications is described. The apparatus may include a receiver to receive an expected air time parameter for an access point, a processor and memory. The memory may store computer-executable code for wireless communication. The code may be executable by the processor to cause the apparatus to determine whether to use the access point for communications based at least in part on the expected air time parameter. The apparatus may include these or other elements configured to carry out various operations of the methods described above and herein.

A non-transitory computer-readable medium is described. The medium may store computer-executable code for wireless communication. The code may be executable by a processor to cause a device to: receive, by a communication device, an expected air time parameter for an access point; and determine whether to use the access point for communications based at least in part on the expected air time parameter. The code may be executable by the processor to perform these or other various operations of the methods described above and herein.

Another method for wireless communication is described. The method may involve determining, by an access point, an expected air time parameter based on current network conditions at the access point. The method also may involve transmitting the expected air time parameter.

The method also may involve receiving, from a communication device, a request message requesting the expected air time parameter. In such a case, transmitting the expected air time parameter may involve transmitting a response message including the expected air time parameter to the communication device in response to the request message.

Transmitting the expected air time parameter may involve broadcasting the expected air time parameter in a wireless beacon. The expected air time parameter may be located in an estimated service parameters portion of the wireless beacon.

The expected air time parameter may be indicative of an estimated air time fraction obtainable for communications between a wireless station and the access point.

The method also may involve determining the estimated air time fraction obtainable for communications between the wireless station and the access point. In such a case, the expected air time parameter may include the estimated air time fraction.

The estimated air time fraction may be determined based at least in part on a parameter from the group consisting of: a number of stations actively being serviced by the access point, an average channel access latency, and a physical protocol data unit transmission time.

The expected air time parameter may be a parameter for use by the wireless station in determining the estimated air time fraction.

Another apparatus for wireless communication is described. The apparatus may include: means for determining, by an access point, an expected air time parameter based on current network conditions at the access point; and means for transmitting the expected air time parameter. The apparatus may include these or other elements configured to carry out various operations of the methods described above and herein.

Another apparatus for wireless communication is described. The apparatus may include a processor and memory. The memory may store computer-executable code for wireless communication. The code may be executable by the processor to cause the apparatus to determine an expected air time parameter based on current network conditions at an access point. The apparatus also may include a transmitter to transmit the expected air time parameter. The apparatus may include these or other elements configured to carry out various operations of the methods described above and herein.

Another non-transitory computer-readable medium is described. The medium may store computer-executable code for wireless communication. The code may be executable by a processor to cause a device to: determine, by an access point, an expected air time parameter based on current network conditions at the access point; and transmit the expected air time parameter. The code may be executable by the processor to perform these or other various operations of the methods described above and herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6B shows a block diagram of another example of an estimated services parameters format including information fields, in accordance with various aspects of the present disclosure;

DETAILED DESCRIPTION

Figure 1:
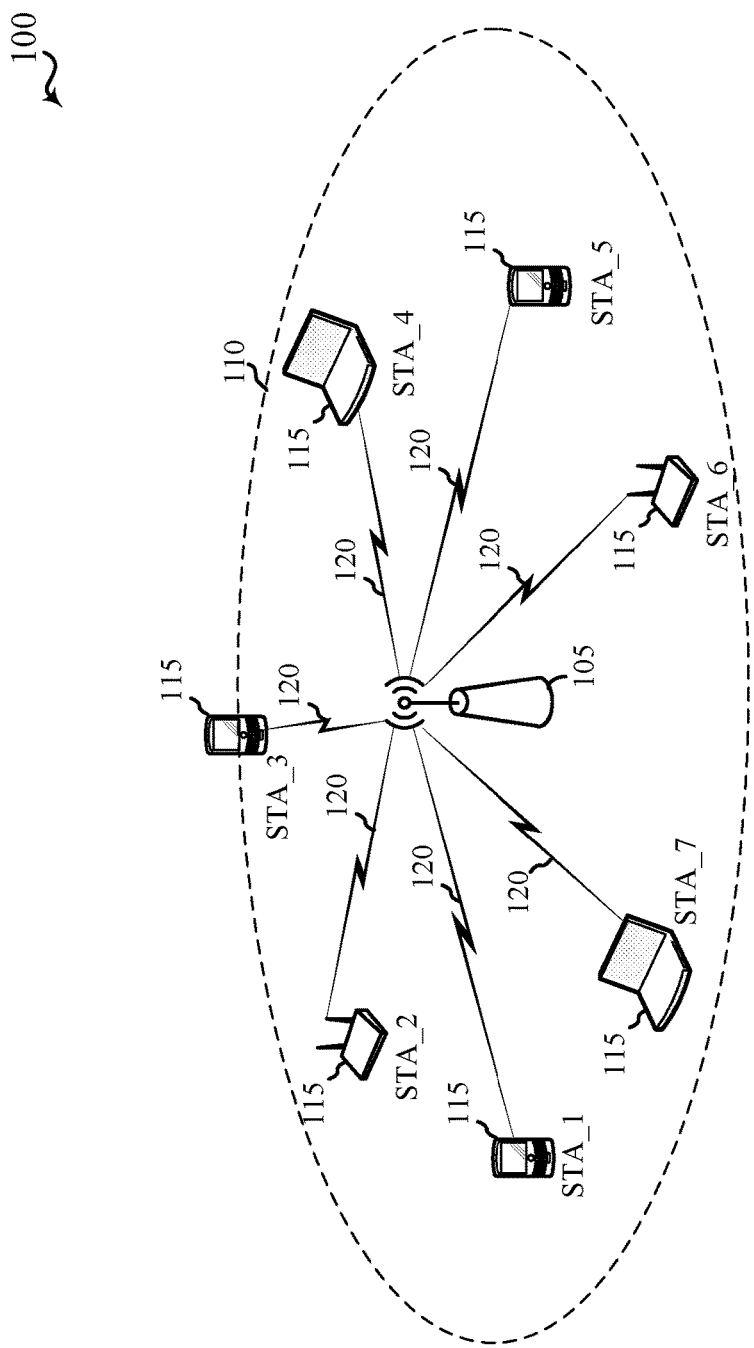
FIG. 1 shows a block diagram of a wireless communication system, in accordance with various aspects of the present disclosure.

The described features generally relate to one or more improved systems, methods, and/or apparatuses for wireless communication. A wireless communication device or a station (STA) may estimate throughput, for example, to determine whether or not to use an access point (AP). The wireless communication device or the STA may use an expected air time parameter for estimating the throughput. The expected air time parameter may be received from the AP, and may be indicative of an estimated air time fraction obtainable for communications using the AP (e.g., communications between the STA and the AP). In one scenario, the communication device may be a cellular base station (e.g., eNB) and may make the determination for another communication device, such as the STA.

The AP may, for example, broadcast (e.g., advertise) either the expected air time parameter or an estimated air time fraction determined (e.g., calculated) from the expected air time parameter. The AP may broadcast the parameter or fraction in a wireless beacon. Alternatively or additionally, the AP may receive a request message (from the communication device or the STA) and transmit a response message including the parameter or fraction in response.

The communication device or the STA may determine an estimated throughput for communications with the AP using the expected air time parameter or the estimated air time fraction received from the AP. The communication device or the STA may use the estimated throughput to determine whether to use the AP for communications.

In one scenario, the STA may perform a roaming procedure (e.g., to determine if another AP with better service than the current AP is available). The STA may receive the expected air time parameter or the estimated air time fraction from the AP. The STA may then determine a throughput estimate (e.g., estimating the throughput that may be expected for the STA using the AP) based at least in part on the expected air time parameter or the estimated air time fraction. The STA may compare this throughput estimate to the actual throughput that the current AP is providing or to a throughput estimate for the current AP. If the throughput is expected to be better using the available AP than using the current AP, the STA may roam to the available AP.

Techniques described herein may be used for various wireless communications systems, including systems implementing radio access technologies (RATs) such as IEEE 802.11 Wireless Local Area Network (e.g., Wi-Fi), Bluetooth, and other radio access technologies. These techniques may also be applied to systems implementing a cellular radio access technology (e.g., Long Term Evolution (LTE)).

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples. As used in the present specification and appended claims, the term "estimated air time fraction" refers to the estimated fraction of air time that a new station joining the network could obtain from the AP. The term "expected air time parameter" refers to information regarding expected air time that is sent from an AP and/or received by a communication device or a STA. The expected air time parameter may be either one or more parameters for determining the estimated air time fraction, or may be the estimated airtime fraction itself (e.g., where the estimated air time fraction is computed by the AP). Thus, in general, the expected air time parameter may be indicative of an estimated air time fraction obtainable for communications using the AP (e.g., communications between a STA and the AP).

Referring first to FIG. 1, a block diagram illustrates an example of a wireless local area network (WLAN) 100 such as, e.g., a network implementing at least one of the IEEE 802.11 family of standards. The WLAN 100 may include an access point (AP) 105 and multiple associated wireless devices or stations (STAs) 115, such as smartphones, personal digital assistants (PDAs), other handheld devices, netbooks, notebook computers, tablet computers, laptops, display devices (e.g., TVs, computer monitors, etc.), printers, etc. The STAs 115 are identified as STA_1, STA_2, STA_3, STA_4, STA_5, STA_6, and STA_7 in FIG. 1. The WLAN 100, however, may have more or fewer STAs 115 than those shown in FIG. 1 since the number shown is simply for illustrative purposes. Also, while one AP 105 is illustrated, the WLAN 100 may have multiple APs 105. Each of the STAs 115, which may also be referred to as mobile stations (MSs), mobile devices, access terminals (ATs), user equipment (UE), subscriber stations (SSs), or subscriber units, may associate and communicate with the AP 105 via a communication link 120. Each AP 105 has a geographic coverage area 110 such that STAs 115 within that area may typically communicate with the AP 105. The STAs 115 may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. The STAs 115 may be dispersed throughout the geographic coverage area 110, and each may be stationary or mobile.

Although not shown in FIG. 1, a STA 115 may be covered by more than one AP 105 and may therefore associate with one or more APs 105 at different times. A single AP 105 and an associated set of stations may be referred to as a basic service set (BSS). An extended service set (ESS) is a set of connected BSSs. A distribution system (DS) (not shown) may be used to connect APs 105 in an extended service set. The geographic coverage area 110 for an AP 105 may be divided into sectors (not shown) making up a portion of the coverage area. The WLAN 100 may include APs 105 of different types (e.g., metropolitan area, home network, etc.), with varying sizes of coverage areas and overlapping coverage areas for different technologies. Although not shown, other wireless devices may communicate with the AP 105.

As discussed above, current techniques for estimating throughput may be inaccurate. Thus, the current techniques may be modified or other approaches may be implemented to increase accuracy for throughput estimation. Determining throughput estimates with increased accuracy may improve the accuracy and reliability of determinations made by the STA to use a particular AP for communications. As discussed further herein, the determination may be to associate with an AP, to roam to an AP or to steer STA traffic over another network to an AP.

Figure 2:
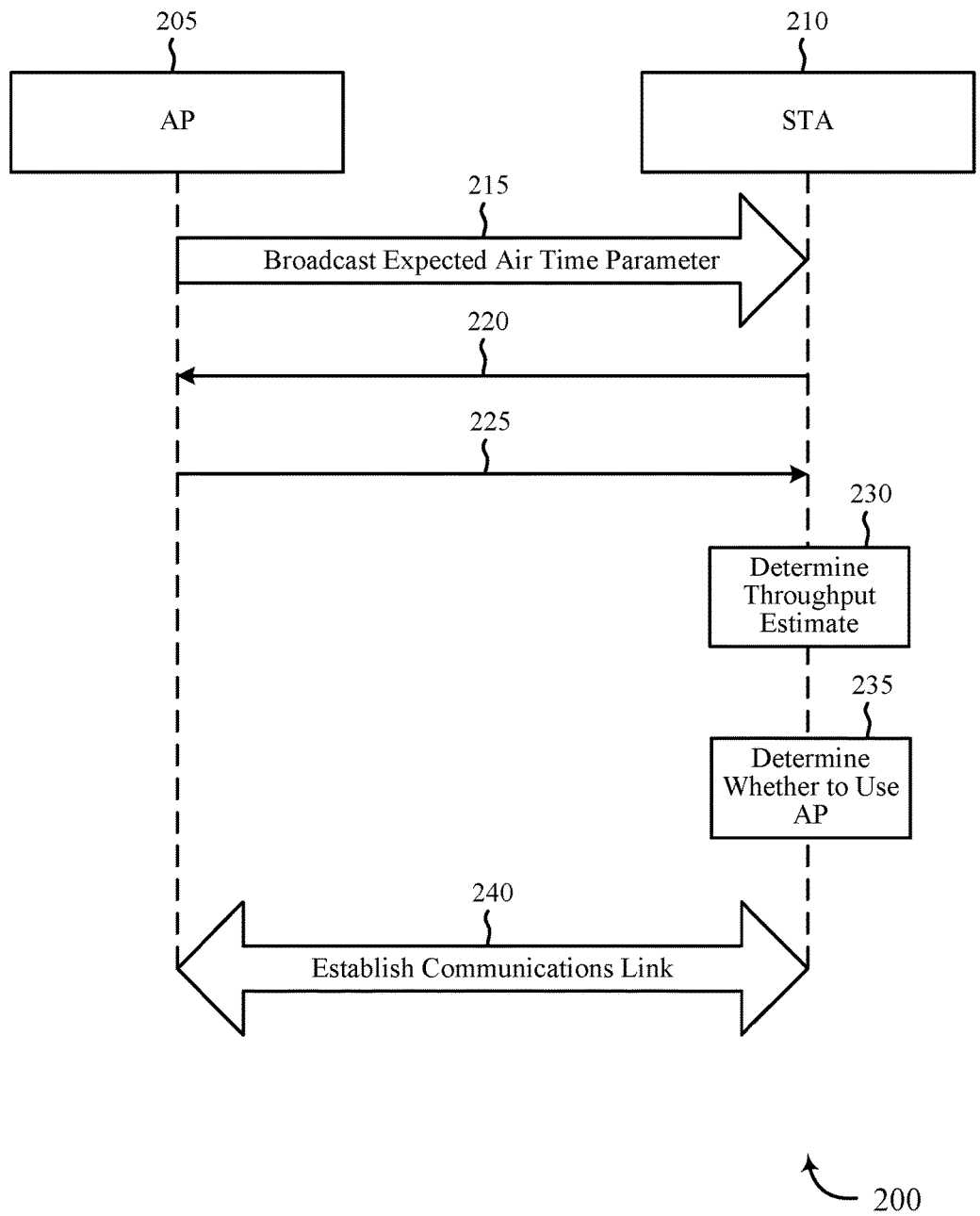
FIG. 2 shows a diagram of an example of communications between an access point (AP), a station (STA), and operations of the STA, in accordance with various aspects of the present disclosure.

FIG. 2 shows a diagram 200 of an example of communications between an access point (AP) 205 and a station (STA) 210 and operations of the STA 210, in accordance with various aspects of the present disclosure. The AP 205 may send a broadcast message 215 that includes an expected air time parameter. The STA 210 may receive the broadcast message 215 when within range of the AP 205 (e.g., within the coverage area of the AP 205).

Alternatively or additionally, the STA 210 may send a request message 220 to the AP 205 requesting the expected air time parameter. In response to the request message 220, the AP 205 may send a response message 225 including the expected air time parameter to the STA 210.

In either case, the STA 210 may use the received expected air time parameter to determine a throughput estimate at block 230. Then, at block 235, the STA 210 may determine whether to use (e.g., associate with) the AP 205 based at least in part on the throughput estimate. Thus, the STA 210 may determine whether to use the AP 205 based at least in part on the received expected air time parameter. If the STA 210 determines to use the AP 205, the AP 205 and the STA 210 may perform communications 240 to establish a communications link.

In general, the foregoing communications may be employed to identify or select a "good" AP for the STA 210. The STA 210 may use the throughput estimate without having any existing traffic (e.g., before association with the AP 205) to determine whether the AP 205 may be capable of providing a suitable or acceptable throughput. For example, the throughput estimate may be compared to a threshold throughput, below which the STA 210 is not likely to receive suitable service from the AP 205. As appropriate or desired, other factors such as signal strength (e.g., RSSI), signal to noise ratio (SNR), quality of the backhaul of the AP, channel availability of non-primary channels, available channel bandwidth, expected number of spatial dimensions, and highest common technology between the transceivers of the STA and the AP (e.g., 802.11ax, 802.11ac, 802.11n) may be used in combination with the throughput estimate to determine whether the STA 210 should use the AP 205 for communications.

As the present specification discusses determining the estimated throughput based at least in part on the expected air time parameter or an estimated air time fraction determined using the expected air time parameter, it should be understood that the estimated throughput goodput may be based at least in part on additional factors, such as the expected physical layer (PHY) goodput. The expected PHY goodput may be determined in any suitable manner such as those known in the art, which are not described herein for simplicity and brevity.

Figure 3:
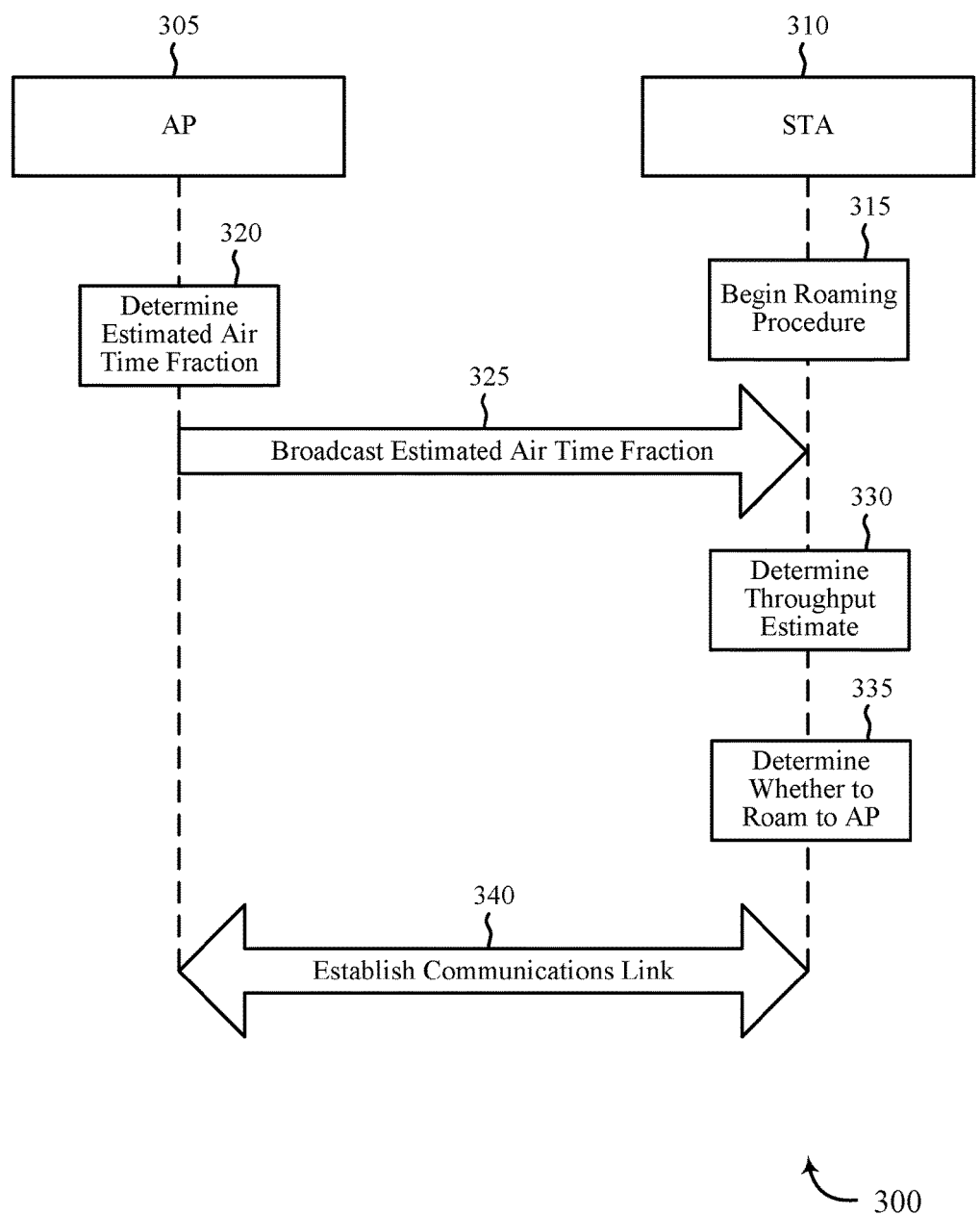
FIG. 3 shows a diagram of another example of communications between an AP and a STA and operations of the AP and the STA, in accordance with various aspects of the present disclosure.

FIG. 3 shows a diagram 300 of another example of communications between an AP 305 and a STA 310 and operations of the AP 305 and the STA 310, in accordance with various aspects of the present disclosure. The STA 310 may begin a roaming procedure at block 315, for example, when the throughput or quality of service provided by a current AP (not shown) is degraded or below a particular threshold. At block 320, the AP 305 may determine an estimated air time fraction, for example, based at least in part on an expected air time parameter. The AP 305 may broadcast the estimated air time fraction, as depicted by communication 325, which may be received by the STA 310.

Alternatively or additionally, the STA 310 may send a request message (not shown) to the AP 305 requesting the estimated air time fraction, and may receive a response message (not shown) including the estimated air time fraction from the AP 305, such as described above with respect to FIG. 2. The STA 310 may send the request message as part of the roaming procedure, for example.

The STA 310 may use the received estimated air time fraction to determine a throughput estimate at block 330. Then, at block 335, the STA 310 may determine whether to roam (e.g., switch) to the AP 305 based at least in part on the throughput estimate. Thus, the STA 310 may determine whether to roam to the AP 305 based at least in part on the received estimated air time fraction. If the STA 310 determines to roam to the AP 305, the AP 305 and the STA 310 may perform communications 340 to establish a communications link.

The STA 310 may perform the roaming procedure to determine if another AP is available with better service than the current AP. The STA 310 may receive the estimated air time fraction from the AP 305, as illustrated in FIG. 3, or may receive an expected air time parameter from which the STA 310 may determine the estimated air time fraction. As discussed above, the communications illustrated in FIG. 3 may be employed to identify or select a suitable AP to which the STA 310 may roam. Using the estimated throughput, the STA 310 may evaluate potential APs for roaming without having any existing traffic to determine actual throughput.

The STA 310 may compare the throughput estimates of available APs with each other to determine a "best" available AP from among the available APs. Then the STA 310 may compare the throughput estimate of the "best" available AP with a throughput estimate (or actual throughput) of the current AP to determine if the STA 310 should roam to the "best" available AP. Alternatively, each of the throughput estimates of available APs may be compared to the throughput estimate (or actual throughput) of the current AP to determine which of the available APs are likely to provide an improvement in communications for the STA 310. From such APs, selection of one AP to roam to may involve a consideration of the throughput estimates, as well as any other suitable factors (e.g., RSSI).

Figure 4:
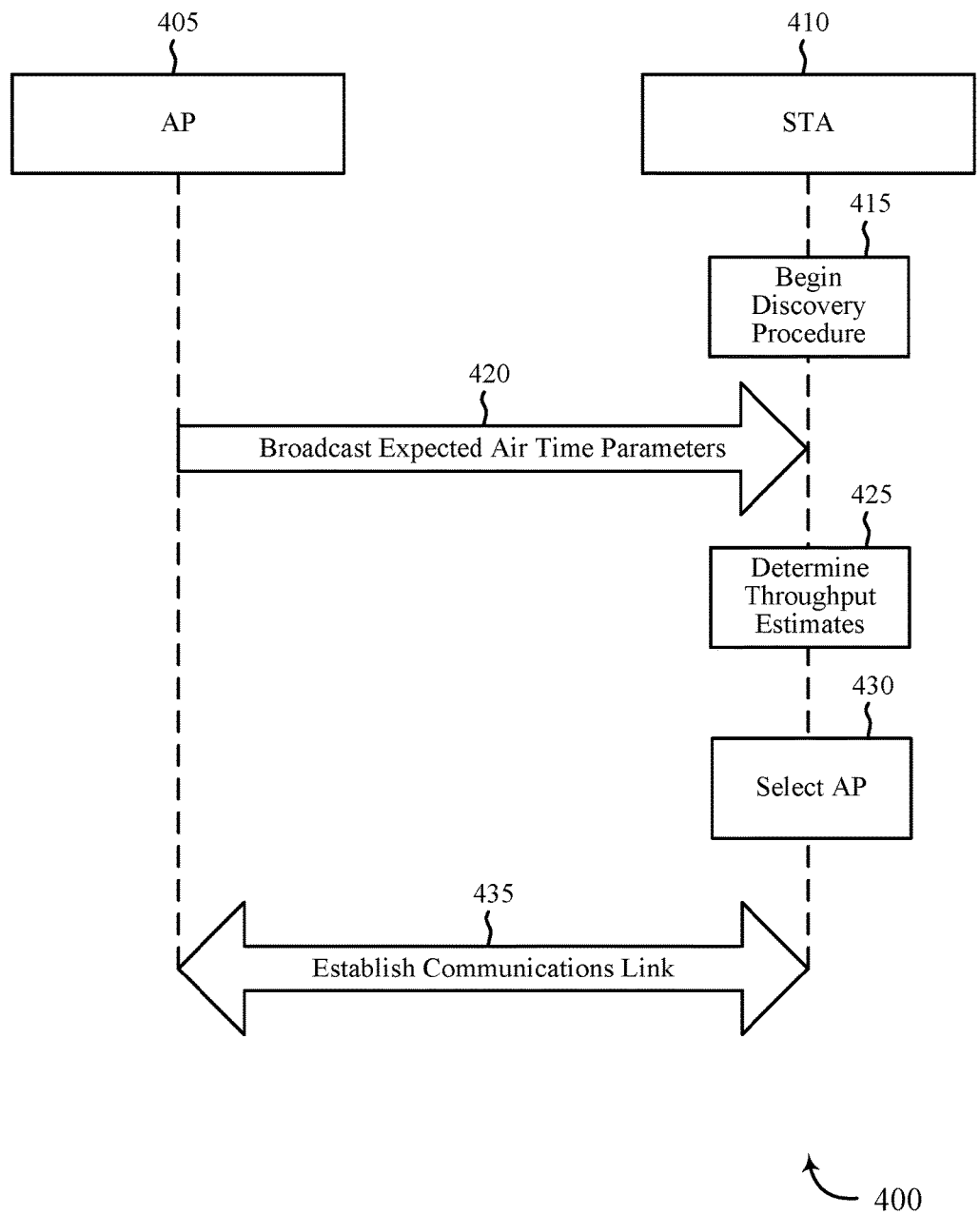
FIG. 4 shows a diagram of yet another example of communications between an AP and a STA and operations of the STA, in accordance with various aspects of the present disclosure.

FIG. 4 shows a diagram 400 of yet another example of communications between an AP 405 and a STA 410 and operations of the STA 410, in accordance with various aspects of the present disclosure. The STA 410 may begin a discovery procedure at block 415. Alternatively, the procedure at block 415 may be a roaming procedure, such as described with respect to FIG. 3. The STA 410 may receive expected air time parameters from a plurality of APs including the AP 405, as depicted by communication 420. The AP 405 and other APs (not shown) may individually broadcast their own expected air time parameter to be received by the STA 410 when within range.

Alternatively or additionally, the STA 410 may send request messages (not shown) to the plurality of APs that are determined to be within range requesting the expected air time parameter from each, and may receive response messages (not shown) including the expected air time parameters from the APs, such as described above with respect to FIG. 2. The STA 310 may send the request message as part of the discovery procedure, for example.

The STA 410 may use the received expected air time parameters to determine throughput estimates for each of the APs at block 425. Then, at block 430, the STA 410 may determine which of the APs to use based at least in part on the throughput estimates, and select the AP 405, for example. Thus, the STA 410 may determine which AP of a plurality of available APs to use based at least in part on the received expected air time parameters. Once selected, the AP 405 and the STA 410 may perform communications 435 to establish a communications link.

The communications illustrated in FIG. 4 may be employed to identify or select a suitable AP for the STA 410 from among a plurality of available APs. Similar to the roaming scenario discussed above with reference to FIG. 3, the STA 410 may use throughput estimates to evaluate the plurality of available APs without having any existing traffic (e.g., before association with any of the available APs). For example, the throughput estimate may be compared to a threshold throughput, below which the STA 210 is not likely to receive suitable service from an AP. From among the available APs that satisfy the threshold throughput, the STA 410 may consider the relative throughput estimates, as well as other factors (e.g., RSSI), to determine which AP the STA 410 should select for communications.

Figure 5:
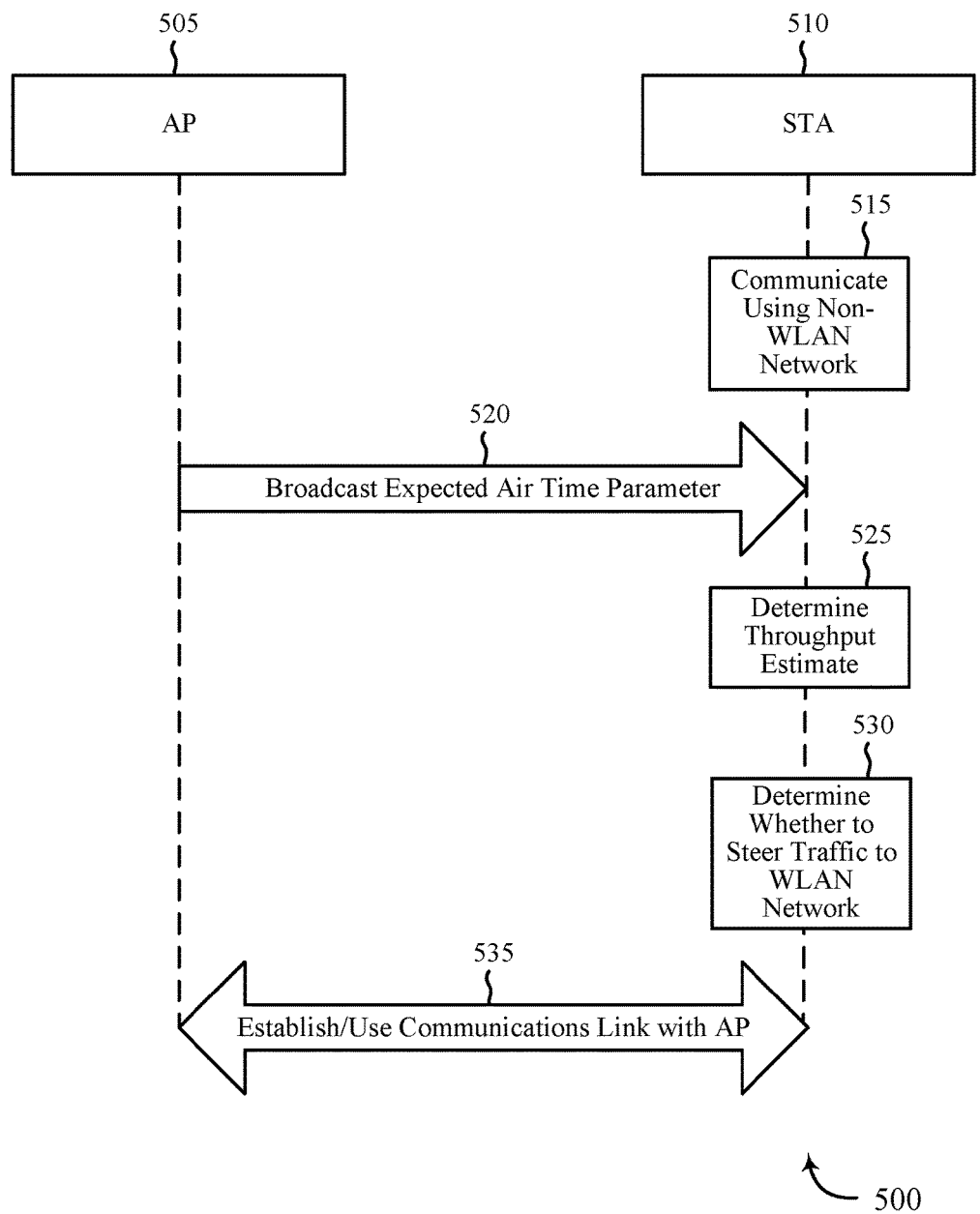
FIG. 5 shows a diagram of still another example of communications between an AP and a STA and operations of the STA, in accordance with various aspects of the present disclosure.

FIG. 5 shows a diagram 500 of still another example of communications between an AP 505 and a STA 510 and operations of the STA 510, in accordance with various aspects of the present disclosure. At block 515, the STA 510 may communicate using a first network, for example, a non-WLAN network such as a cellular network. The STA 510 may receive an expected air time parameter from the AP 505, as depicted by communication 520. The AP 505 may broadcast the expected air time parameter to be received by the STA 510 when within range. Alternatively or additionally, the STA 510 may send a request message (not shown) to the AP 505 requesting the expected air time parameter, and may receive a response message (not shown) including the expected air time parameter from the AP 505, such as described above with respect to FIG. 2.

The STA 510 may use the received expected air time parameter to determine a throughput estimate for the AP 505 at block 525. Then, at block 530, the STA 510 may determine whether to steer traffic from the first (e.g., non-WLAN) network to the WLAN (of which the AP 505 is a part) based at least in part on the throughput estimate. Thus, the STA 510 may determine whether to steer such traffic to the AP 505 based at least in part on the received expected air time parameter. If the STA 510 is not already associated with the AP 505, the AP 505 and the STA 510 may perform communications 535 to establish a communications link when traffic is to be steered to the AP 505. If the STA 510 is already associated with the AP 505, then the AP 505 and the STA 510 may use the existing communications link with the AP for the steered traffic.

Although the foregoing discusses the STA 510 determining whether to switch from using the first network to using the WLAN for communications currently over the first network, it should be understood that the STA 510 may evaluate the first network and the WLAN to determine which network to use for intended communication (e.g., without having existing traffic over either network). As such, the STA 510 may compare the estimated throughputs of the first network and the WLAN, and select the network that is likely to provide better throughput for the STA 510.

Figure 6A:
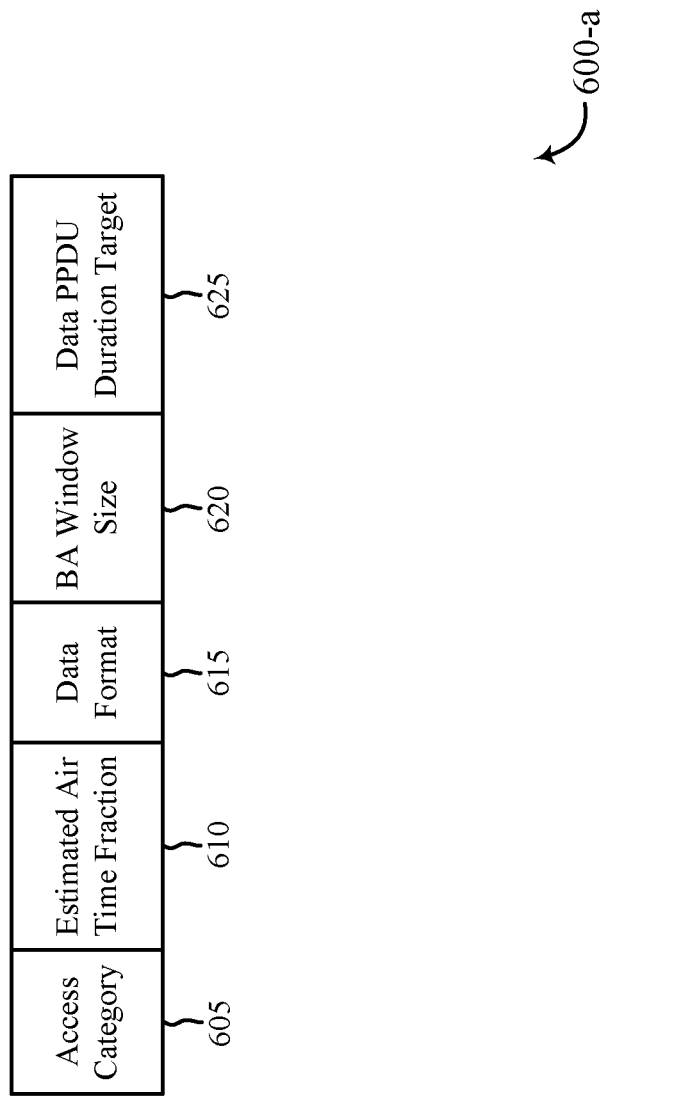
FIG. 6A shows a block diagram of an example of an estimated services parameters format including information fields, in accordance with various aspects of the present disclosure.

FIG. 6A shows a block diagram of an example of an estimated services parameters (ESP) format 600-*a* including information fields, in accordance with various aspects of the present disclosure. As described herein, the ESP format 600-*a* may be employed as part of a wireless beacon or as part of a response message from an AP.

The ESP format 600-*a* may include an access category information field 605, an estimated air time fraction information field 610, a data format information field 615, a block acknowledgement (BA) window size information field 620 and a data physical protocol data unit (PPDU) duration target (or PPDU transmission time) information field 625. The access category information field 605 may identify the access class (AC) for which the other fields apply. For example, the estimated air time fraction in estimated air time fraction information field 610 may be for the identified AC. Thus, as described herein, the AP may provide an estimated air time fraction for each AC when broadcasting such information, or may respond with the estimated air time fraction(s) for the AC(s) requested by a STA. The throughput for a given access class may be estimated using the corresponding estimated air time fraction, such as described further below. The data format information field 615, the BA window size information field 620, and the data PPDU duration target (or PPDU transmission time) in information field 625 may provide or determine additional parameters for determining the estimated throughput, such as described further below.

FIG. 6B shows a block diagram of another example of an estimated services parameters (ESP) format 600-*b* including information fields, in accordance with various aspects of the present disclosure. As above, the ESP format 600-*b* may be employed as part of a wireless beacon or as part of a response message from an AP.

The ESP format 600-*b* may include an access category information field 605-*a*, a number of active stations information field 630, a channel access latency information field 635, a random access delay information field 640, a data format information field 615-*a*, a BA window size information field 620-*a* and a data PPDU duration target (or PPDU transmission time) information field 625-*a*. The access category information field 605-*a*, the data format information field 615-*a*, the BA window size information field 620-*a* and the data PPDU duration target (or PPDU transmission time) information field 625-*a* may be configured as described with respect to FIG. 6A.

The number of stations an AP is actively servicing may be indicated in the active stations information field 630. A channel access latency parameter may be included in the channel access latency information field 635. A random access delay parameter may be included in the random access delay information field 640. Each of these may provide parameters for determining the estimated air time fraction for a given access class. Thus, when the ESP format 600-*b* is employed, the STA may determine (e.g., calculate) the estimated air time fraction for determining the estimated throughput, such as described herein.

For example, an equation for determining an estimated throughput may be:

$$R_{estimated}(\text{AC}) = \frac{N_{bits\ per\ PPDU}}{T_{PPDU}} * \alpha_{estimated\ air\ time\ fraction}(\text{AC})$$

where $R_{estimated}(\text{AC})$ is the estimated throughput for a given access class, $N_{bits\ per\ PPDU}$ equals (MPDU_pPPDU×A_MSDU_B×8), $T_{PPDU}$ is the duration in time of the PPDU, and $\alpha_{estimated\ air\ time\ fraction}(\text{AC})$ is the estimated fraction of air time that a new station joining the network could obtain from the AP for the given access class, where MPDU_pPPDU is the number of MPDUs per PPDU, and A_MSDU_B is the lesser of the MSDU transmission time and the MSDU reception time.

Although the determination of the estimated air time fraction may be implementation-specific, the following is an example equation:

$$\alpha(AC) = \frac{1}{\frac{[N_{active\ STA}(AC) + 1] * \text{Average\_Channel\_Latency}(AC)}{T_{PPDU}} + 1}$$

where $N_{active\ STA}(\text{AC})$ is the number of STAs the AP is actively servicing in the access class, Average_Channel_Latency (AC) is the average latency to access the channel for the given access class as determined by the AP (e.g., time taken from initial attempt to transmit a packet to actual transmission of the packet), and $T_{PPDU}$ is defined as above. The AP may intermittently, periodically or continuously measure the channel latency for packets the AP transmits.

Another example equation for determining the estimated air time fraction is:

$$\alpha(AC) = \frac{\text{Channel Utilization}}{\frac{BOV + RCOV}{T_{PPDU}} + 1}$$

where Channel Utilization is determined by the AP,

BOV is the average random access delay (e.g., WiFi maximum random backoff divided by 2), RCOV is the channel access latency incurred by using request-to-send/clear-to-send (RTS/CTS), and $T_{PPDU}$ is defined as above.

Figure 7A:
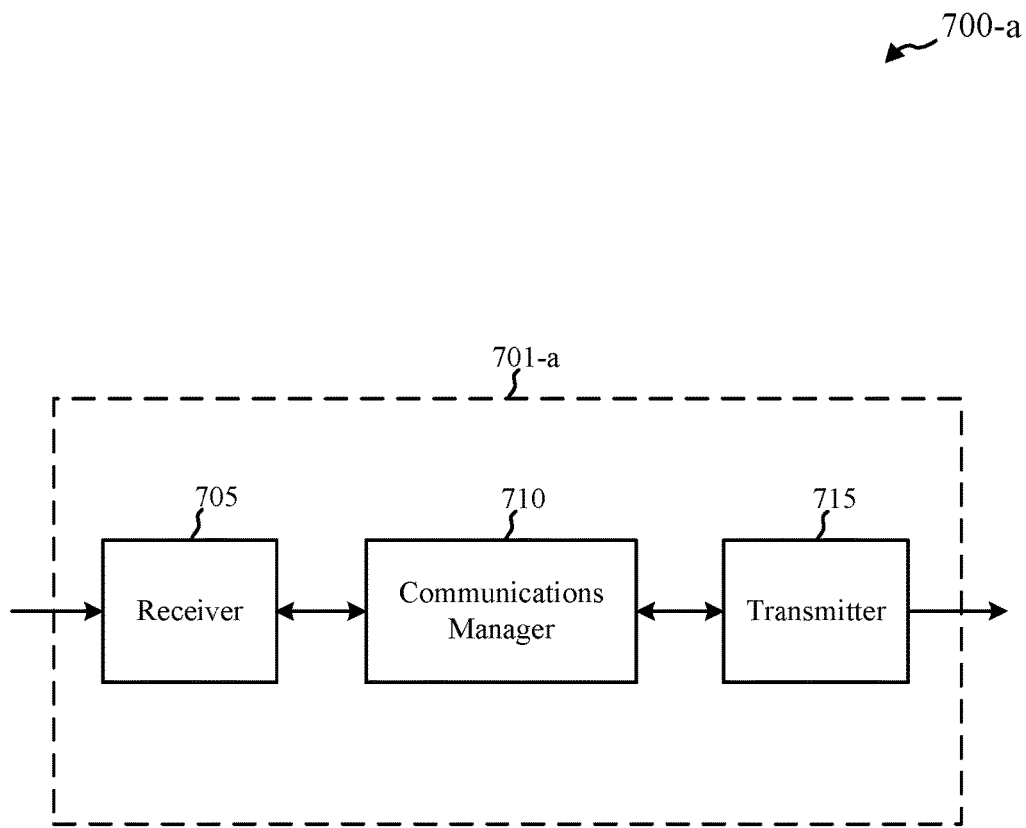
FIG. 7A shows a block diagram of an example of a STA that may be used for wireless communications, in accordance with various aspects of the present disclosure.

Turning now to FIG. 7A, a block diagram 700-*a* of an apparatus 701-*a* is shown that may be used for wireless communications, in accordance with various aspects of the present disclosure. The apparatus 701-*a* may be an example of various aspects of the STAs 115, 210, 310, 410 and 510 described with reference to FIGS. 1, 2, 3, 4 and/or 5. The apparatus 701-*a* may also include or be implemented by a processor. The apparatus 701-*a* may include a receiver 705, a communications manager 710, and a transmitter 715. Each of these components may be in communication with each other.

The components of the apparatus 701-*a* (as well as those of other related apparatus described herein) may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors.

The receiver 705 may be or include a radio frequency (RF) receiver, such as an RF receiver operable to receive transmissions according to a particular radio access technology (RAT), such as WLAN. The receiver 705 also may be or include a radio frequency (RF) receiver, such as an RF receiver operable to receive transmissions according to a different RAT, such as cellular (e.g., LTE). The receiver 705 may be used to receive various types of data or control signals (e.g., transmissions) over communication link(s) (e.g., physical channels) of a wireless communication system, such as communication links of the WLAN 100 described with reference to FIG. 1. The receiver 705 may be used to receive a broadcast wireless beacon and/or to receive a response message from an AP (not shown). As described herein, the beacon or response message may include an expected air time parameter, such as an estimated air time fraction or parameters for determining the estimated air time fraction.

The transmitter 715 may be or include an RF transmitter, such as an RF transmitter operable to transmit according to the particular RAT, such as WLAN. The transmitter 715 also may be or include an RF transmitter, such as an RF transmitter operable to transmit according to the different RAT, such as cellular (e.g., LTE). The transmitter 715 may be used to transmit various types of data or control signals (e.g., transmissions) over communication link(s) (e.g., physical channels) of a wireless communication system, such as communication links of the WLAN 100 described with reference to FIG. 1. The transmitter 715 may be used to transmit a request message to request an expected air time parameter from an AP (not shown).

The communications manager 710 may be used to manage wireless communication according to the particular RAT, e.g., WLAN, and the different RAT, e.g., LTE. For example, the communications manager 710 may be used to manage the transmitter 715 and the receiver 705. According to aspects of this disclosure, the communications manager 710 may be used to manage or otherwise control the receiver 705 and the transmitter 715 so that an expected air time parameter is obtained from an AP (not shown). The communications manager 710 may use the expected air time parameter to determine an estimated throughput that the apparatus 701-*a* may expect to achieve using the AP (not shown). The communications manager 710 also may be configured to use the estimated throughput to determine whether to use the AP (not shown).

Figure 7B:
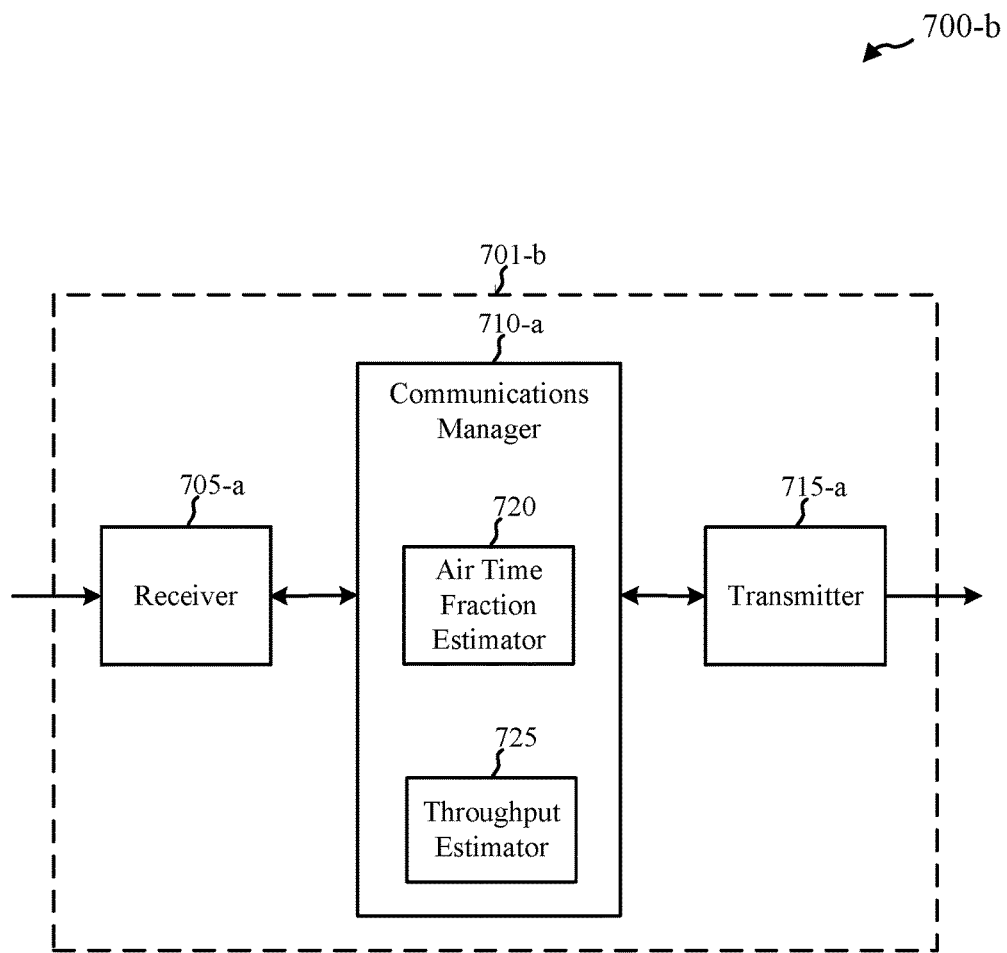
FIG. 7B shows a block diagram of another example of a STA apparatus that may be used for wireless communications, in accordance with various aspects of the present disclosure.

FIG. 7B shows a block diagram 700-*b* of an apparatus 701-*b* that may be used for wireless communications, in accordance with various aspects of the present disclosure. The apparatus 701-*b* may be an example of various aspects of the apparatus 701-*a* described above with reference to FIG. 7A or the STAs 115, 210, 310, 410 and 510 described with reference to FIGS. 1, 2, 3, 4 and/or 5. The apparatus 701-*b* may also include or be implemented by a processor. The apparatus 701-*b* may include a receiver 705-*a*, a communications manager 710-*a*, and a transmitter 715-*a*. Each of these components may be in communication with each other.

The receiver 705-*a* and the transmitter 715-*a* may operate similarly to the receiver 705 and the transmitter 715, respectively, as described above with reference to FIG. 7A. The communications manager 710-*a* also may perform similar operations as the communications manager 710 described above with reference to FIG. 7A. Further, the communications manager 710-*a* may include an air time fraction estimator 720 and a throughput estimator 725.

As discussed herein, in the case of the expected air time parameter being a parameter(s) for calculating the estimated air time fraction, the communications manager 710-*a* may employ the air time fraction estimator 720 to calculate an estimated air time fraction using the received parameter(s). Then, the communications manager 710-*a* may employ the throughput estimator 725 to determine an estimated throughput from the calculated estimated air time fraction. The communications manager 710-*a* then may use the estimated throughput to determine whether to use the corresponding AP (not shown).

Figure 7C:
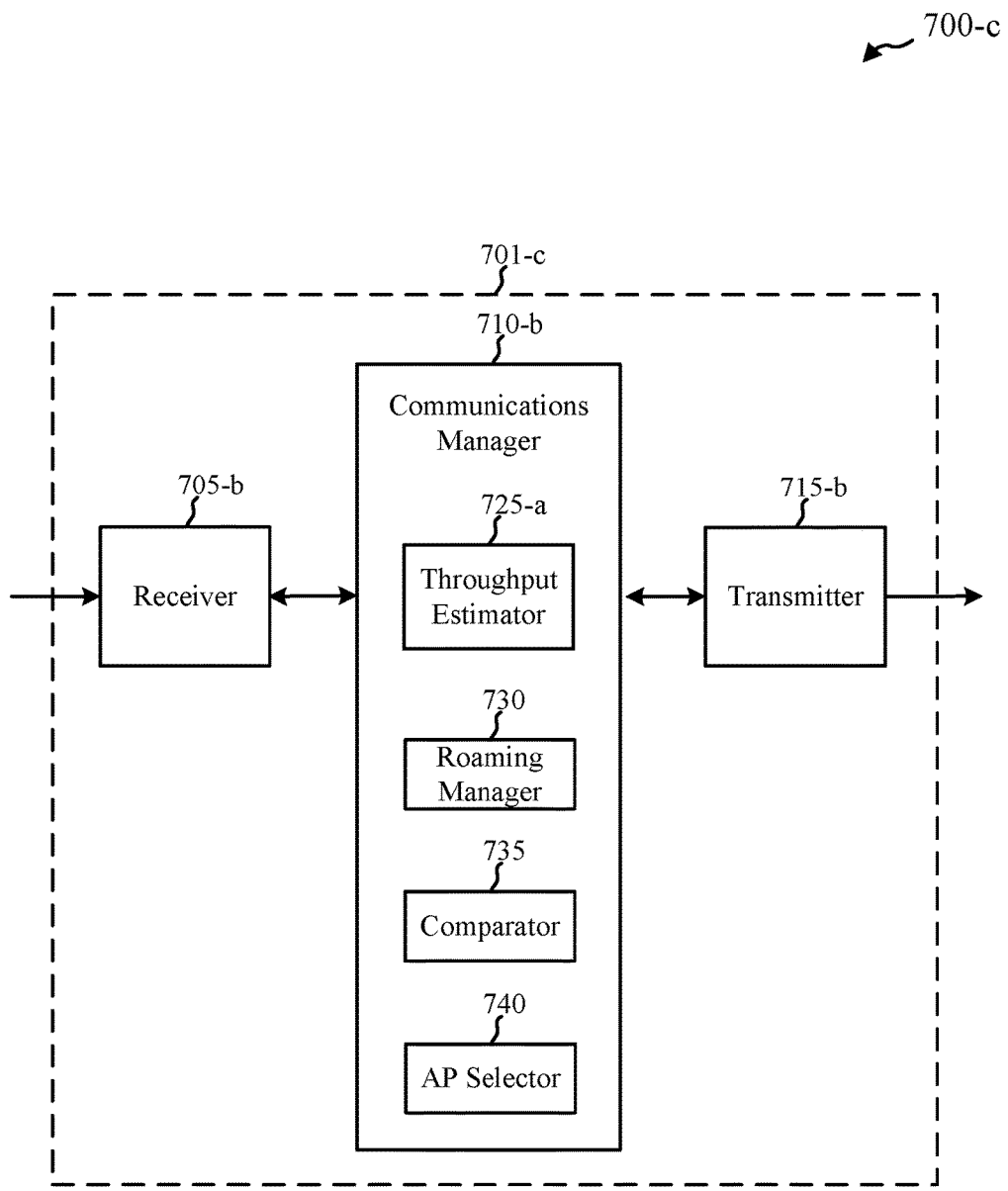
FIG. 7C shows a block diagram of yet another example of a STA that may be used for wireless communications, in accordance with various aspects of the present disclosure.

FIG. 7C shows a block diagram 700-*c* of an apparatus 701-*c* that may be used for wireless communications, in accordance with various aspects of the present disclosure. The apparatus 701-*c* may be an example of various aspects of the apparatus 701-*a*, 701-*b* described above with reference to FIGS. 7A or 7B, or the STAs 115, 210, 310, 410 and 510 described with reference to FIGS. 1, 2, 3, 4 or 5. The apparatus 701-*c* may also include or be implemented by a processor. The apparatus 701-*c* may include a receiver 705-*b*, a communications manager 710-*b*, and a transmitter 715-*b*. Each of these components may be in communication with each other.

The receiver 705-*b* and the transmitter 715-*b* may operate similarly to the receiver 705 and the transmitter 715, respectively, as described above with reference to FIG. 7A. The communications manager 710-*b* also may perform similar operations as the communications manager 710, 710-*a* described above with reference to FIGS. 7A or 7B. Further, the communications manager 710-*b* may include a throughput estimator 725-*a*, a roaming manager 730, a comparator 735 and an AP selector 740.

The roaming manager 730 may manage roaming operations for the apparatus 701-*c*. Such operations may include, for example, determining when to begin a roaming procedure, determining available APs and changing communication links to roam from a current AP to a different AP.

The receiver 705-*b* may receive wireless beacons from APs that are in range. Although there may be no APs in range, the following assumes that at least one AP is in range. Each wireless beacon received from an AP may include an expected air time parameter for the respective AP.

Alternatively, the communications manager 710-*b* may determine the APs that are in range (e.g., using the transmitter 715-*b* and/or the receiver 705-*b*) and may send a request message via the transmitter 715-*b* to each AP in range to request that the AP(s) send the expected air time parameter. The receiver 705-*b* then may receive a response message(s) including the expected air time parameter from the respective AP(s), and provide the expected air time parameter(s) to the communications manager 710-*b* or directly to the throughput estimator 725-*a*.

The throughput estimator 725-*a* may determine an estimated throughput for each AP using the corresponding expected air time parameter, and may provide the estimated throughput(s) to the comparator 735. In some cases, the throughput estimator 725-*a* may determine an estimated throughput for the current AP being used by the apparatus 701-*c*, similar to the other available AP(s). In other cases, some measure of the actual throughput being provided by the current AP may be determined and provided to the comparator 735. The comparator 735 may compare the estimated throughput of the other available AP(s) and the estimated/actual throughput of the current AP, and provide a result of the comparison to the AP selector 740. The AP selector 740 then may select one of the APs based at least in part on the result of the comparison. The roaming manager 730 then may perform operations to roam to the selected AP, or in the case of the current AP being selected, may reattempt roaming (e.g., for a predetermined time or number of attempts).

Figure 7D:
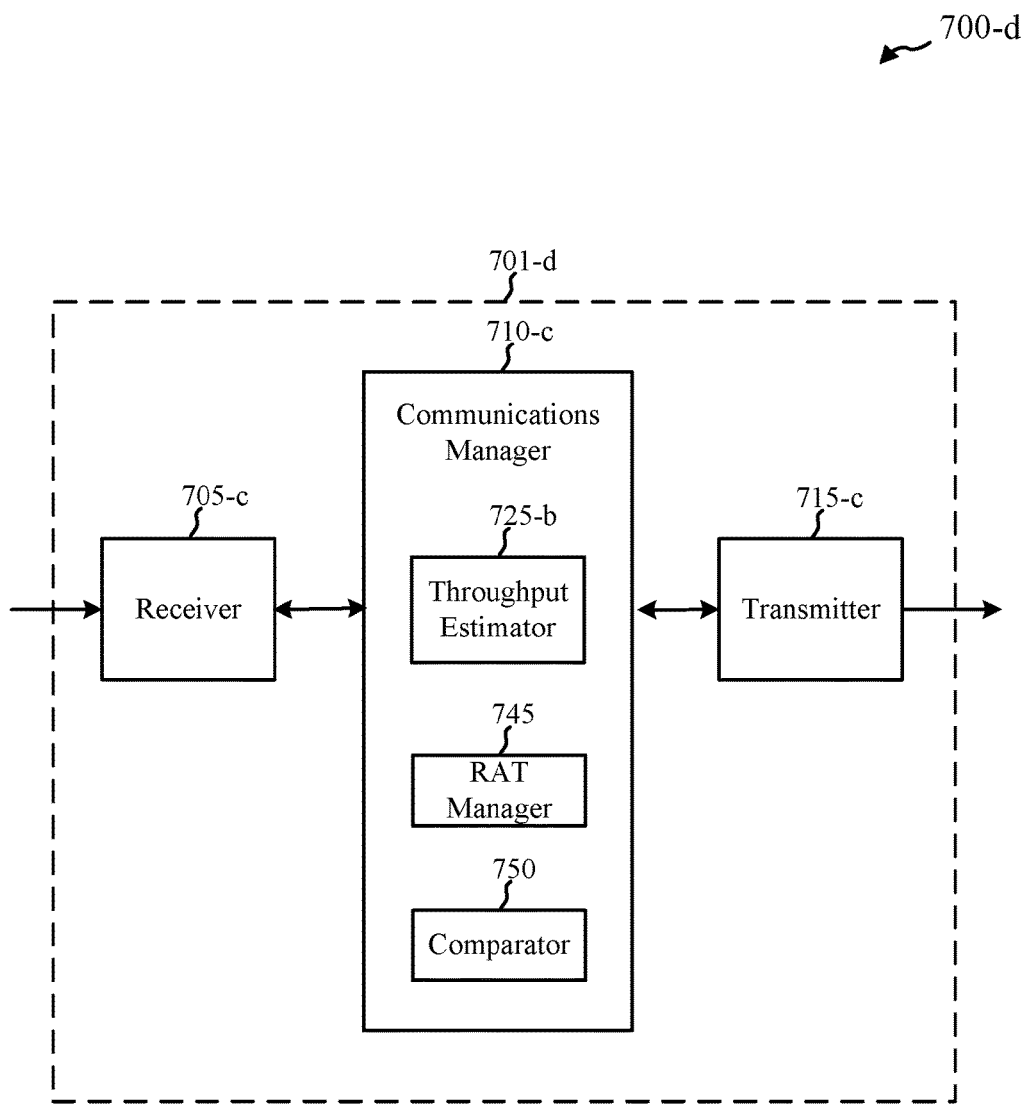
FIG. 7D shows a block diagram of still another example of a STA that may be used for wireless communications, in accordance with various aspects of the present disclosure.

FIG. 7D shows a block diagram 700-*d* of an apparatus 701-*d* that may be used for wireless communications, in accordance with various aspects of the present disclosure. The apparatus 701-*d* may be an example of various aspects of the apparatus 701-*a*, 701-*b*, 701-*c* described above with reference to FIG. 7A, 7B or 7C, or the STAs 115, 210, 310, 410 and 510 described with reference to FIGS. 1, 2, 3, 4 or 5. The apparatus 701-*d* may also be a processor. The apparatus 701-*d* may include a receiver 705-*c*, a communications manager 710-*c*, and a transmitter 715-*c*. Each of these components may be in communication with each other.

The receiver 705-*c* and the transmitter 715-*c* may operate similarly to the receiver 705 and the transmitter 715, respectively, as described above with reference to FIG. 7A. The communications manager 710-*c* may perform similar operations as the communications manager 710, 710-*a*, 710-*b* described above with reference to FIG. 7A, 7B or 7C. Further, the communications manager 710-*b* may include a throughput estimator 725-*b*, an RAT manager 745 and a comparator 750.

The RAT manager 745 may manage communication links with multiple networks operating according to different RATs. For example, the apparatus 701-*d* may have an established communications link to a cellular network and an established communications link to a WLAN network (via an AP). The communications manager 710-*c* may be managing active communications over the cellular network. However, if the WLAN network is capable of providing suitable service for such communications, the communications manager 710-*c* may steer the communications to the communications link for the WLAN network. The estimated throughput that may be provided by the AP associated with the WLAN may be one factor for determining whether to steer the communications as such.

The throughput estimator 725-*b* may operate similar to the throughput estimator 725, described above with reference to FIG. 7B, to determine an estimated throughput for the AP. The estimated throughput may be provided to the comparator, for example, to compare with the estimated/actual throughput over the cellular network. Based at least in part on a result of the comparison, the communications manager 710-*c* may determine that the communications should be steered to the WLAN network. The communications manager 710-*c*, alone or in conjunction with the RAT manager 745, may steer the communications from the cellular network to the WLAN network. Such an approach may be helpful, for example, if the quality of service over the cellular network is degraded or if providing service over the WLAN network is desired (e.g., to avoid using cellular network minutes).

Figure 8A:
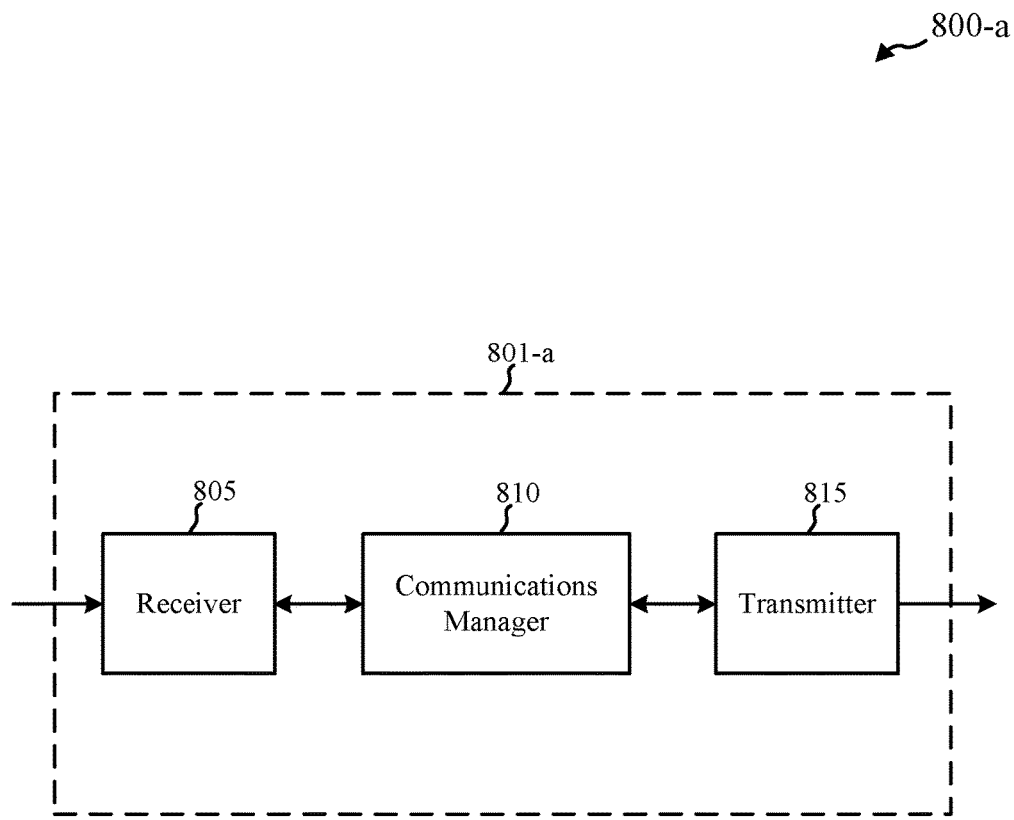
FIG. 8A shows a block diagram of an example of an AP that may be used for wireless communications, in accordance with various aspects of the present disclosure.

Turning now to FIG. 8A, a block diagram 800-*a* of an apparatus 801-*a* is shown that may be used for wireless communications, in accordance with various aspects of the present disclosure. The apparatus 801-*a* may be an example of various aspects of the APs 105, 205, 305, 405 and 505 described with reference to FIGS. 1, 2, 3, 4 and/or 5. The apparatus 801-*a* may also include or be implemented by a processor. The apparatus 801-*a* may include a receiver 805, a communications manager 810, and a transmitter 815. Each of these components may be in communication with each other.

The components of the apparatus 801-*a* (as well as those of other related apparatuses described herein) may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors.

The receiver 805 may be or include a radio frequency (RF) receiver, such as an RF receiver operable to receive transmissions according to a particular radio access technology (RAT), such as WLAN. The receiver 705 may be used to receive various types of data or control signals (e.g., transmissions) over communication link(s) (e.g., physical channels) of a wireless communication system, such as communication links of the WLAN 100 described with reference to FIG. 1. The receiver 805 may be used to receive a request message from a STA (not shown). As described herein, the request message may request an expected air time parameter, such as an estimated air time fraction or parameters for determining the estimated air time fraction.

The transmitter 815 may be or include an RF transmitter, such as an RF transmitter operable to transmit according to the particular RAT, such as WLAN. The transmitter 815 may be used to transmit various types of data or control signals (e.g., transmissions) over communication link(s) (e.g., physical channels) of a wireless communication system, such as communication links of the WLAN 100 described with reference to FIG. 1. The transmitter 815 may be used to transmit a response message to provide an expected air time parameter to the STA (not shown) in response to the request message. Alternatively or additionally, the transmitter 815 may be used to broadcast a wireless beacon of the apparatus 801-*a*. As described herein, the beacon may include an expected air time parameter, such as an estimated air time fraction or parameters for determining the estimated air time fraction.

The communications manager 810 may be used to manage wireless communication according to the particular RAT, e.g., WLAN. For example, the communications manager 810 may be used to manage the transmitter 815 and the receiver 805. According to aspects of this disclosure, the communications manager 810 may be used to manage or otherwise control the receiver 805 and the transmitter 815 so that an expected air time parameter is provided to a STA(s) (not shown). The communications manager 810 thus may provide the expected air time parameter to the STA(s) so that the STA(s) may determine an estimated throughput that the STA(s) may expect to achieve using the apparatus 801-*a*.

Figure 8B:
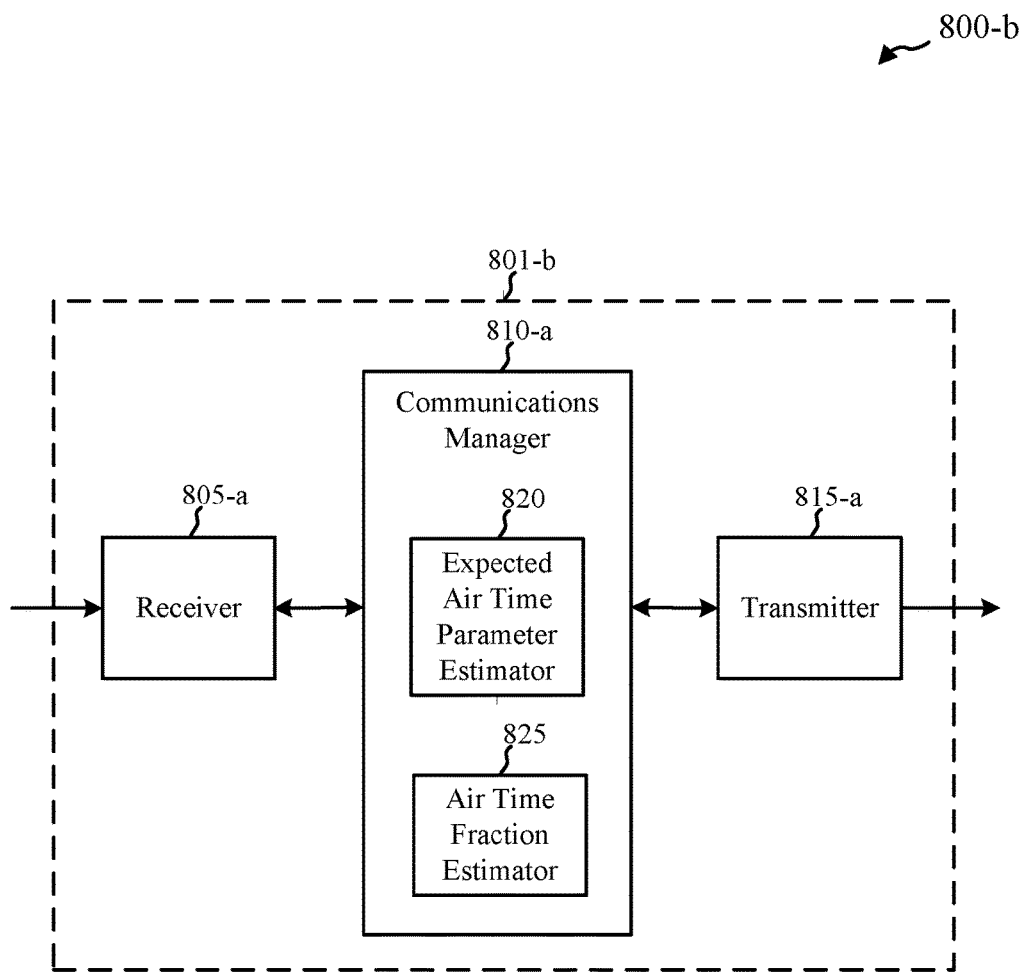
FIG. 8B shows a block diagram of another example of an AP that may be used for wireless communications, in accordance with various aspects of the present disclosure.

FIG. 8B shows a block diagram 800-*b* of an apparatus 801-*b* that may be used for wireless communications, in accordance with various aspects of the present disclosure. The apparatus 801-*b* may be an example of various aspects of the apparatus 801-*a* described above with reference to FIG. 8A or the APs 105, 205, 305, 405 and 505 described with reference to FIGS. 1, 2, 3, 4 and/or 5. The apparatus 801-*b* may also include or be implemented by a processor. The apparatus 801-*b* may include a receiver 805-*a*, a communications manager 810-*a*, and a transmitter 815-*a*. Each of these components may be in communication with each other.

The receiver 805-*a* and the transmitter 815-*a* may operate similarly to the receiver 805 and the transmitter 815, respectively, as described above with reference to FIG. 8A. The communications manager 810-*a* also may perform similar operations as the communications manager 810 described above with reference to FIG. 8A. Further, the communications manager 810-*a* may include an expected air time parameter estimator 820 and an air time fraction estimator 825.

As discussed herein, in the case of the expected air time parameter being a parameter(s) for calculating the estimated air time fraction, the communications manager 810-*a* may employ the expected air time parameter estimator 820 to determine the corresponding parameter(s). Such corresponding parameter(s) may be provided to the air time fraction estimator 825 to calculate an estimated air time fraction. Then, the communications manager 810-*a* may employ the transmitter 815-*a* to transmit or broadcast the estimated air time fraction to the STA(s) (not shown).

Figure 9A:
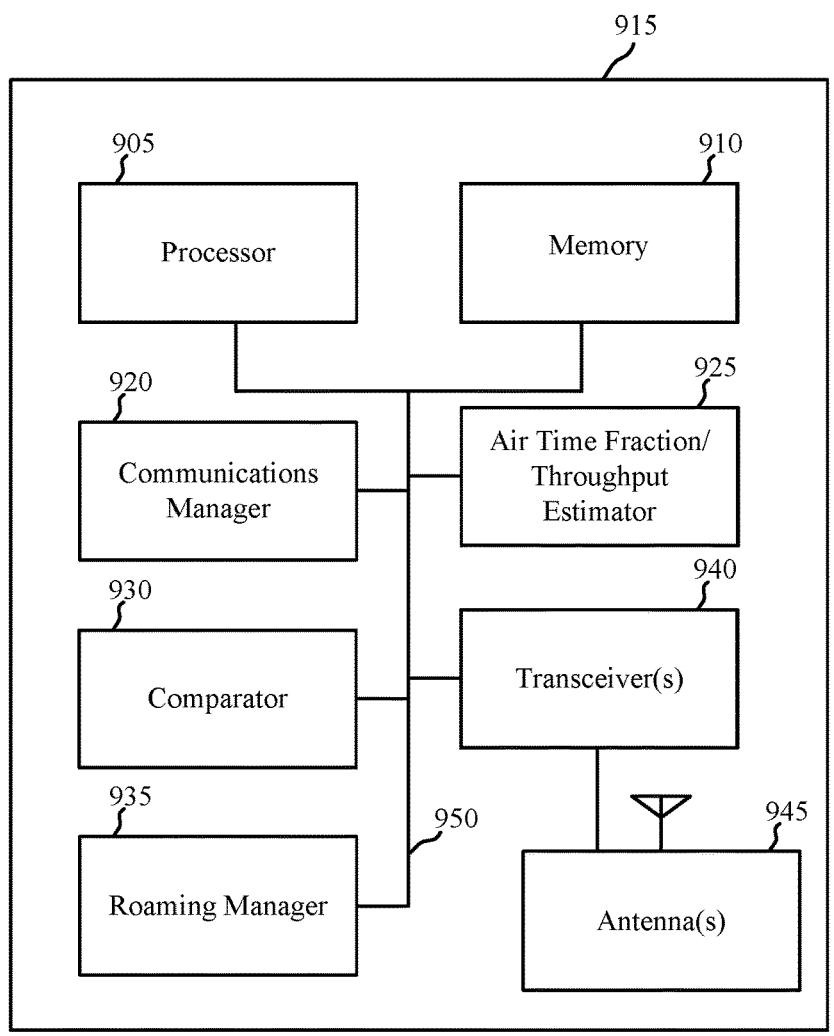
FIG. 9A shows a block diagram illustrating an example of an architecture for a STA for wireless communications, in accordance with various aspects of the present disclosure.

FIG. 9A shows a block diagram 900-*a* illustrating an example of an architecture for a STA 915 for wireless communications, in accordance with various aspects of the present disclosure. The STA 915 may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 915 may in some cases have an internal power supply (not shown), such as a small battery, to facilitate mobile operation. The STA 915 may be an example of various aspects of the apparatus 701-*a*, 701-*b*, 701-*c*, 701-*d* described with reference to FIGS. 7A, 7B, 7C and 7D, or the STAs 115, 210, 310, 410 and 510 described with reference to FIGS. 1, 2, 3, 4 or 5. The STA 915 may implement at least some of the features and functions described with reference to FIGS. 1, 2, 3, 4, 5, 7A, 7B, 7C and 7D. The STA 915 may communicate with APs 105 described with reference to FIG. 1.

The STA 915 may include a processor 905, a memory 910, a communications manager 920, an air time fraction/throughput estimator 925, a comparator 930, a roaming manager 935, a transceiver 940 and an antenna 945. Each of these components may be in communication with each other, directly or indirectly, over a bus 950.

The memory 910 may include random access memory (RAM) or read-only memory (ROM). The processor 905 may include an intelligent hardware device, e.g., a CPU, a microcontroller, an ASIC, etc. The processor 905 may process information received through the transceiver(s) 940 or information to be sent to the transceiver(s) 940 for transmission through the antenna(s) 945. Such information may be stored in the memory 910 and accessed by the processor 905 (as well as other components, as appropriate or desired). The processor 905 may handle, alone or in connection with the communications manager 920, the air time fraction/throughput estimator 925, the comparator 930 and the roaming manager 935, and various aspects of communicating over various RATs.

The transceiver(s) 940 may include a modem to modulate packets and provide the modulated packets to the antenna(s) 945 for transmission, and to demodulate packets received from the antenna(s) 945. The transceiver(s) 940 may in some cases be implemented as separate transmitters and receivers. The transceiver(s) 940 may support communications according to various RATs. The transceiver(s) 940 may communicate bi-directionally, via the antenna(s) 945, with the access point(s) 105, 205, 305, 405, 505 described with reference to FIGS. 1, 2, 3, 4 or 5, or the apparatus 801-a, 801-b described with reference to FIG. 8A or 8B. While the STA 915 may include a single antenna 945, there may be implementations in which the STA 915 may include multiple antennas 945.

The communications manager 920 may perform and control some or all of the features and functions described with reference to FIGS. 1, 2, 3, 4 and 5 related to wireless communication, estimating throughput and determining an AP to use. For example, communications manager 920, in conjunction with the air time fraction/throughput estimator 925, the comparator 930 and the roaming manager 935, may implement a WLAN roaming scheme that takes into account the estimated throughput of APs for the STA 915, such as described with reference to FIG. 3. The communications manager 920 may be an example of various aspects of the communications manager 710, 710-a, 710-b or 710-c described with reference to FIGS. 3A, 3B, 3C or 3D. The communications manager 920, or portions of it, may include a processor, and some or all of the functionality of the communications manager 920 may be performed by the processor 905 or in connection with the processor 905.

The components of the STA 915 may be configured to implement aspects discussed above with respect FIGS. 1, 2, 4, 5, 7A, 7B, 7C or 7D as well, and those aspects may not be repeated here for the sake of brevity. Moreover, the components of the STA 915 may be configured to implement aspects discussed below with respect to FIGS. 11 or 12, and those aspects may not be repeated here also for the sake of brevity.

Figure 9B:
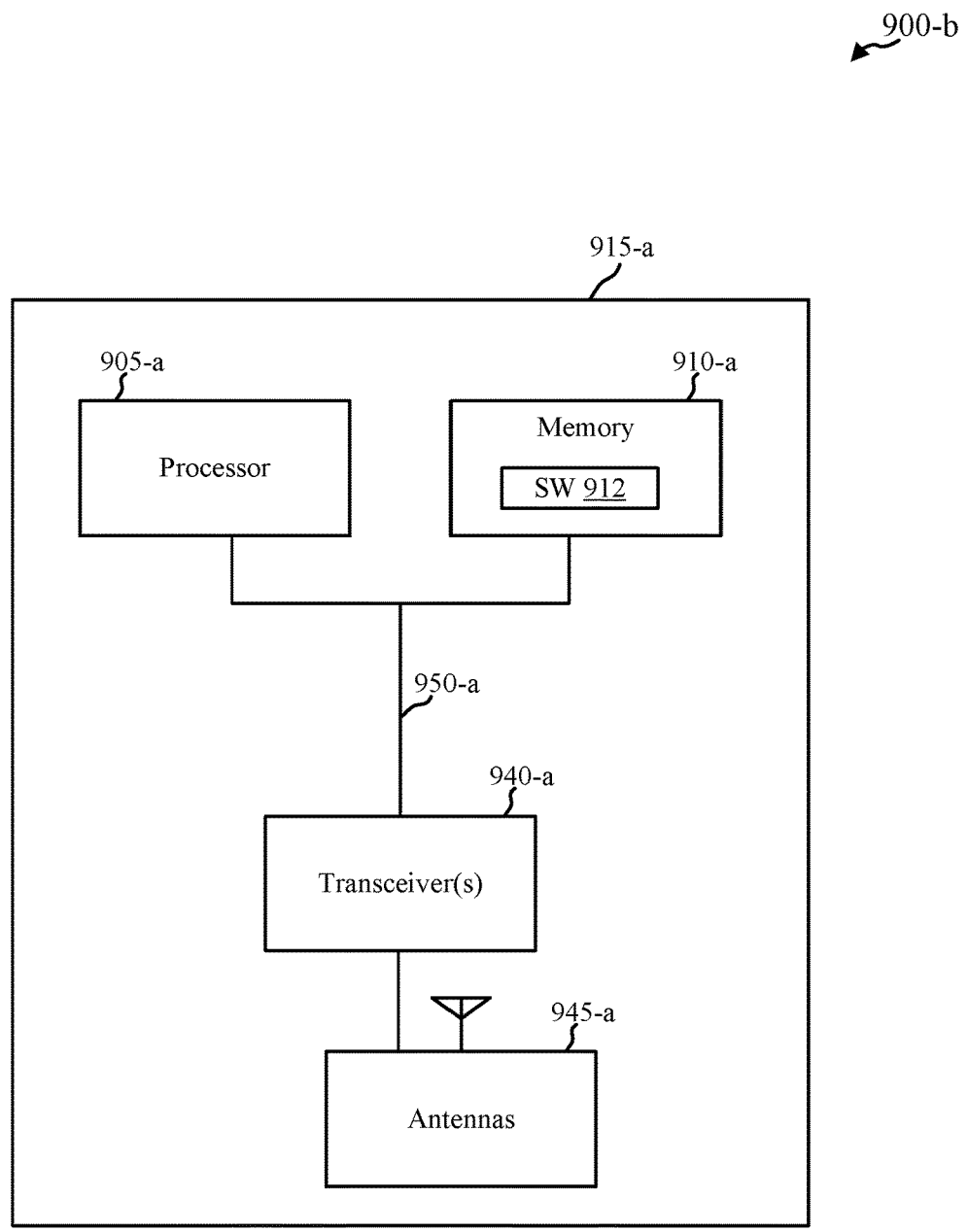
FIG. 9B shows a block diagram illustrating another example of an architecture for a STA for wireless communications, in accordance with various aspects of the present disclosure.

FIG. 9B shows a block diagram 900-b illustrating an example of an architecture for a STA 915-a for wireless communications, in accordance with various aspects of the present disclosure. The STA 915-a may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 915-a may in some cases have an internal power supply (not shown), such as a small battery, to facilitate mobile operation. The STA 915 may be an example of various aspects of the apparatus 701-a, 701-b, 701-c, 701-d described with reference to FIGS. 7A, 7B, 7C or 7D, or the STAs 115, 210, 310, 410 and 510 described with reference to FIGS. 1, 2, 3, 4 or 5. The STA 915 may implement at least some of the features and functions described with reference to FIGS. 1, 2, 3, 4, 5, 7A, 7B, 7C or 7D. The STA 915 may communicate with APs 105 described with reference to FIG. 1.

The STA 915-a may include a processor 905-a, a memory 910-a, a transceiver 940-a, and an antenna 945-a. Each of these components may be in communication with each other, directly or indirectly, over a bus 950-a. The transceiver(s) 940-a and the antenna(s) 945-a may be configured similarly to the transceiver(s) 940 and the antenna(s) 945, respectively, described above with respect to FIG. 9A.

The processor 905-a may include an intelligent hardware device, e.g., a CPU, a microcontroller, an ASIC, etc. The processor 905-a may process information received through the transceiver(s) 940-a and information to be sent to the transceiver(s) 940-a for transmission through the antenna(s) 945-a. Such information may be stored in the memory 910-a and accessed by the processor 905-a. The processor 905-a may handle various aspects of communicating over various RATs.

The memory 910-a may include RAM and read-only memory ROM. The memory 910-a may store computer-readable, computer-executable software (SW) code 912 containing instructions that, when executed, cause the processor 905-a to perform various functions described herein for communicating via various RATs, such as some or all of the features and functions described with reference to FIG. 1, 2, 3, 4, 5, 7A, 7B, 7C, 7D or 9A related to wireless communication, estimating throughput and determining an AP to use. Alternatively, the software code 912 may not be directly executable by the processor 905-a but may cause the STA 915-a (e.g., when compiled and executed) to perform various functions described herein.

The components of the STA 915-a may be configured to implement aspects discussed above with respect FIGS. 1, 2, 3, 4, 5, 7A, 7B, 7C, 7D or 9A, and those aspects may not be repeated here for the sake of brevity. Moreover, the components of the STA 915-a may be configured to implement aspects discussed below with respect to FIGS. 11 or 12, and those aspects may not be repeated here also for the sake of brevity.

Figure 10A:
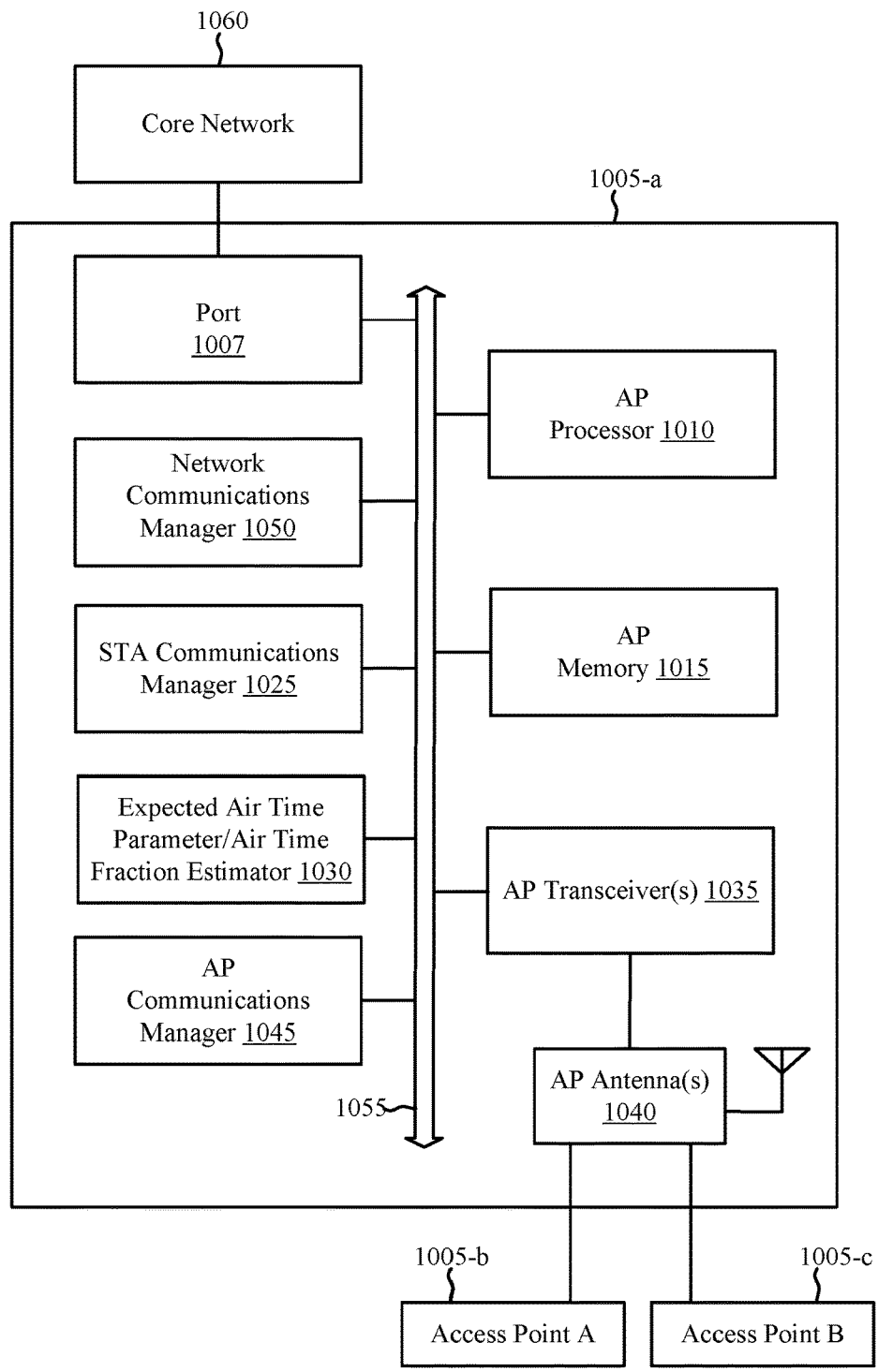
FIG. 10A shows a block diagram illustrating an example of an architecture for an AP for wireless communications, in accordance with various aspects of the present disclosure.

FIG. 10A shows a block diagram 1000-a illustrating an example of an architecture for an AP 1005-a for wireless communications, in accordance with various aspects of the present disclosure. The AP 1005-a may be an example of the APs 105, 205, 305, 405, 505 described with reference to FIGS. 1, 2, 3, 4 or 5, or the apparatus 801-a, 801-b described with reference to FIGS. 8A or 8B. The AP 1005-a may include an AP processor 1010, an AP memory 1015, a STA communications manager 1025 for communicating with STAs, an expected air time parameter/air time fraction estimator 1030, an AP transceiver 1035, and an AP antenna 1040. The STA communications manager 1025 may be an example of the communications managers 810, 810-a of FIGS. 8A or 8B. The AP 1005-a may also include one or both of an AP communications manager 1045 and a network communications manager 1050 for communicating with APs 1005-b, 1005-c (e.g., via AP antenna(s) 1040 and AP transceiver(s) 1035) and a core network 1060 (e.g., via a wired port 1007), respectively. Each of the components of the AP 1005-a may be in communication with each other, directly or indirectly, over at least one bus 1055.

The components of the AP 1005-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The AP processor 1010 may include an intelligent hardware device, e.g., a central processing unit (CPU), a microcontroller, an ASIC, etc. The AP processor 1010 may process information received through the AP transceiver(s) 1035, the AP communications manager 1045, or the network communications manager 1050. The AP processor 1010 may also process information to be sent to the AP transceiver(s) 1035 for transmission through the AP antenna(s) 1040, to the AP communications manager 1045, or to the network communications manager 1050. The AP processor 1010 may handle, alone or in connection with the STA communications manager 1025 and the expected air time parameter/air time fraction estimator 1030, various aspects related to wireless communications with the STAs 115, 210, 310, 410, 510, 701-a, 701-b, 701-c, 701-d.

The AP transceiver(s) 1035 may be configured to communicate bi-directionally with the STAs 115, 210, 310, 410, 510 in FIGS. 1, 2, 3, 4 or 5, or the apparatus 701-a, 701-b, 701-c, 701-d in FIGS. 7A, 7B, 7C or 7D. The AP transceiver(s) 1035 may be implemented as at least one transmitter module and at least one separate receiver module. The AP transceiver(s) 1035 may receive information such as packets, user data, or control information associated with various information channels (e.g., control channels, data channels, etc.). For example, the AP transceiver(s) 1035 may be configured to receive a request message from a STA requesting an expected air time parameter. Information may be passed on to other components of the AP 1005-a, such as the AP processor 1010, the memory 1015 and the STA communications manager 1025. The AP transceiver(s) 1035 also may transmit signals (e.g., transmit response messages, broadcast wireless beacons, etc.) received from other components of the AP 1005-a.

The AP transceiver(s) 1035 may include a modem configured to modulate the packets and provide the modulated packets to the AP antenna(s) 1040 for transmission, and to demodulate packets received from the AP antenna(s) 1040. While the AP 1005-a may include a single antenna, there may be aspects in which the AP 1005-a may include multiple AP antennas 1040.

According to the architecture of FIG. 10A, the AP 1005-a may include the expected air time parameter/air time fraction estimator 1030 to determine the expected air time parameter (e.g., various parameters as described herein) and/or to determine the air time fraction using the expected air time parameter. Alternatively, functionality of the expected air time parameter/air time fraction estimator 1030 may be implemented as a component of the STA communications manager 1025, as a computer program product, or as at least one controller element of the AP processor 1010.

The STA communications manager 1025 or the AP transceiver(s) may be configured to generate the wireless beacon and/or the response message including the expected air time parameter. The STA communications manager 1025 or the AP transceiver(s) may implement the ESP formats 600-a, 600-b described with reference to FIGS. 6A or 6B.

The components of the AP 1005-a may be configured to implement aspects discussed above with respect FIGS. 1, 2, 3, 4, 5, 8A or 8B, and those aspects may not be repeated here for the sake of brevity. Moreover, the components of the AP 1005-a may be configured to implement aspects discussed below with respect to FIGS. 13 or 14, and those aspects may not be repeated here also for the sake of brevity.

Figure 10B:
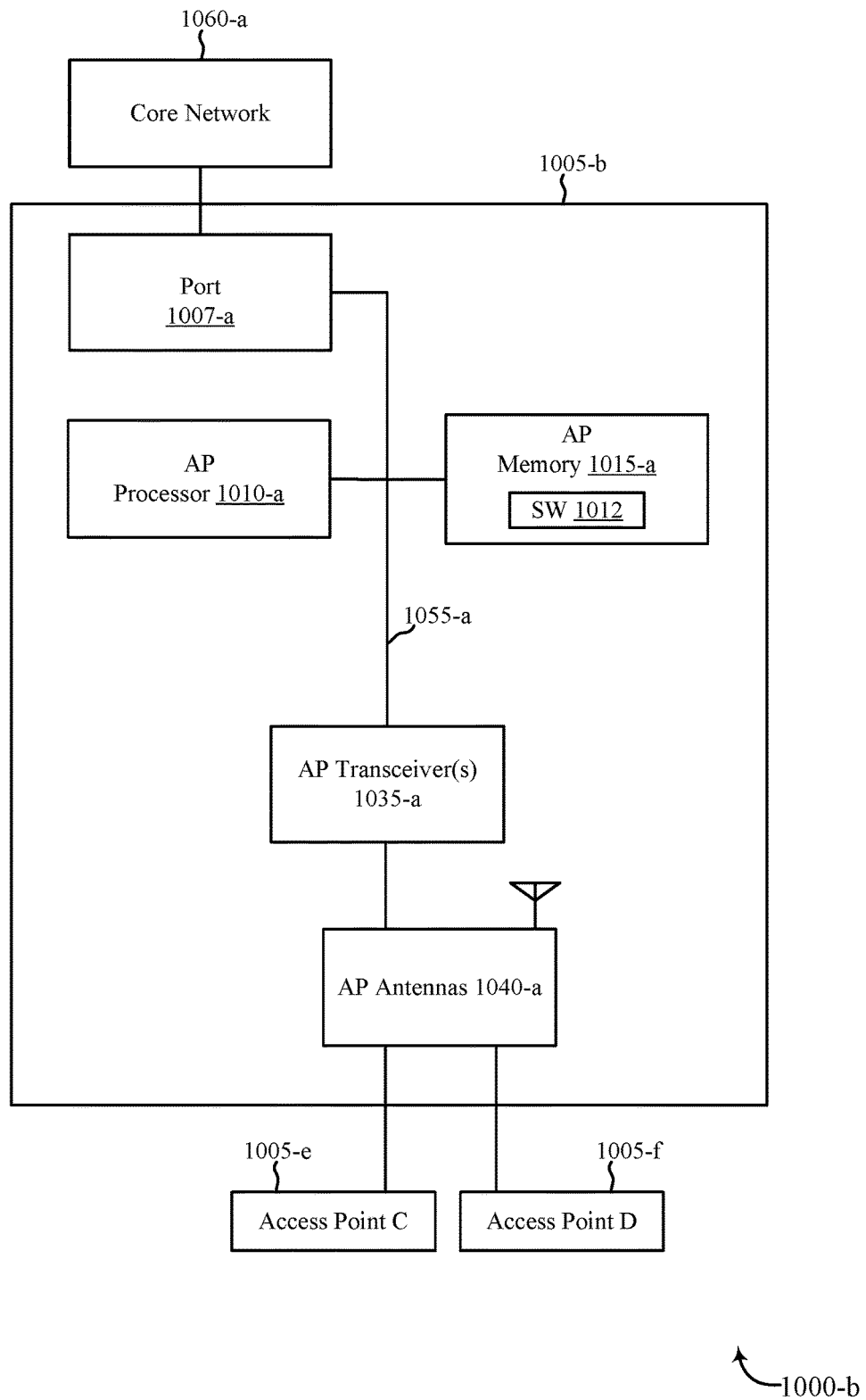
FIG. 10B shows a block diagram illustrating another example of an architecture for an AP for wireless communications, in accordance with various aspects of the present disclosure.

FIG. 10B shows a block diagram 1000-b illustrating an example of an architecture for an AP 1005-b for wireless communications, in accordance with various aspects of the present disclosure. The AP 1005-b may be an example of the APs 105, 205, 305, 405, 505 described with reference to FIGS. 1, 2, 3, 4 or 5, or the apparatus 801-a, 801-b described with reference to FIGS. 8A or 8B. The AP 1005-b may include an AP processor 1010-a, an AP memory 1015-a, an AP transceiver 1035-a and an AP antenna 1040-a. Each of the components of the AP 1005-a may be in communication with each other, directly or indirectly, over at least one bus 1055-a. The AP transceiver(s) 1035-a and the antenna(s) 1040-a may be configured similarly to the AP transceiver(s) 1035 and the AP antenna(s) 1040, respectively, described above with respect to FIG. 10A.

The AP processor 1010-a may include an intelligent hardware device, e.g., a CPU, a microcontroller, an ASIC, etc. The AP processor 1010-a may process information received through the AP transceiver(s) 1035-a and information to be sent to the AP transceiver(s) 1035-a for transmission through the AP antenna(s) 1040-a. Such information may be stored in the AP memory 1015-a and accessed by the AP processor 1010-a. The processor 1010-a may handle various aspects of communicating over various RATs.

The AP memory 1015-a may include RAM and read-only memory ROM. The memory 1015-a may store computer-readable, computer executable software (SW) code 1012 containing instructions that, when executed, cause the AP processor 1010-a to perform various functions described herein for communicating via various RATs, such as some or all of the features and functions described with reference to FIGS. 1, 2, 3, 4, 5, 8A, 8B or 10A related to wireless communication and providing an expected air time parameter. Alternatively, the software code 1012 may not be directly executable by the AP processor 1010-a but may cause the AP 1005-a (e.g., when compiled and executed) to perform various functions described herein.

The components of the AP 1005-a may be configured to implement aspects discussed above with respect FIGS. 1, 2, 3, 4, 5, 8A, 8B or 10A, and those aspects may not be repeated here for the sake of brevity. Moreover, the components of the AP 1005-a may be configured to implement aspects discussed below with respect to FIGS. 13 or 14, and those aspects may not be repeated here also for the sake of brevity.

Figure 11:
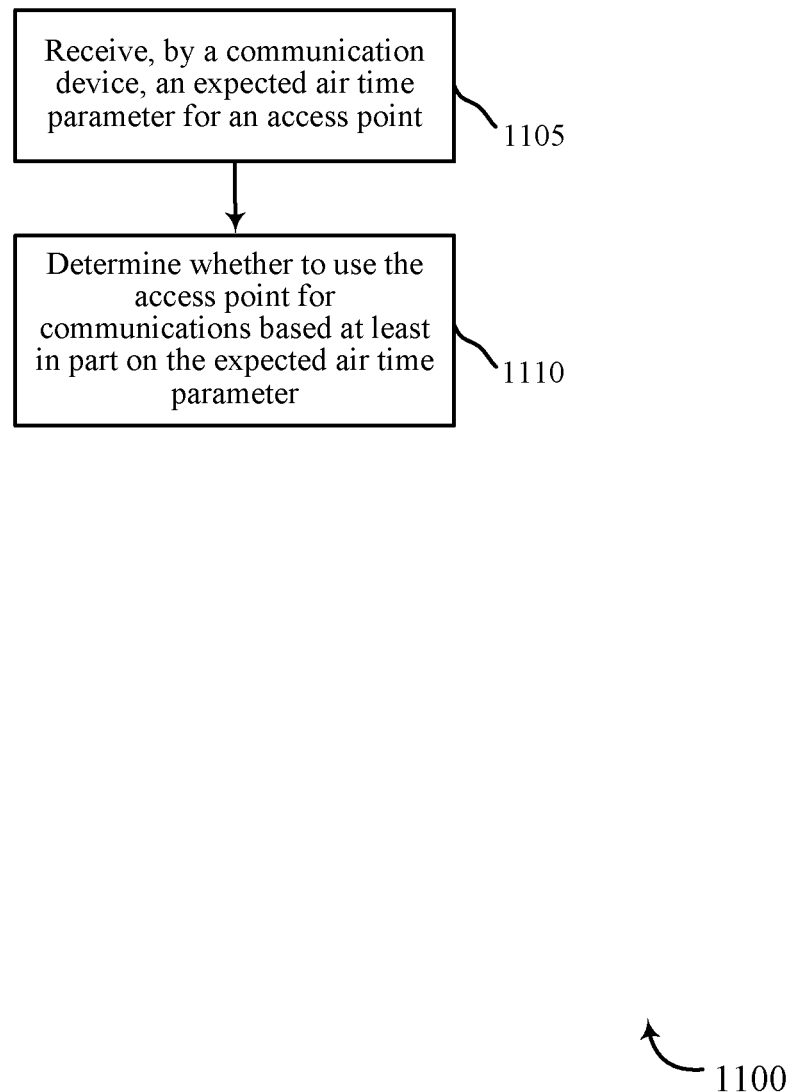
FIG. 11 is a flowchart illustrating an example of a method for wireless communication, in accordance with various aspects of the present disclosure.

FIG. 11 is a flowchart illustrating an example of a method 1100 for wireless communication, in accordance with various aspects of the present disclosure. The method 1100 described below may be performed in accordance with aspects of the apparatus 701-a, 701-b, 701-c, 701-d described with reference to FIGS. 7A, 7B, 7C and 7D, or the STAs 115, 210, 310, 410 and 510 described with reference to FIGS. 1, 2, 3, 4 or 5. Such a STA or apparatus may execute sets of codes to control the functional elements of the STA or apparatus to perform the functions described below.

At block 1105, the method may involve receiving, by a wireless station (STA), an expected air time parameter for an access point (AP). The STA may receive the expected air time parameter as part of a broadcast wireless beacon or as part of a directed transmission. Then, at block 1110, the expected air time parameter may be used to determine whether to use the AP for communications. As discussed above, the expected air time parameter may be an estimated air time fraction, which represents the fraction of airtime that the STA may expect to receive using the AP. Alternatively, the expected air time parameter may be a parameter(s) for determining the estimated air time fraction. In such a manner, the STA may determine whether to associate with the AP, to roam to the AP, to select from among multiple APs or to direct traffic from a first network to a second network including the AP.

Figure 12:
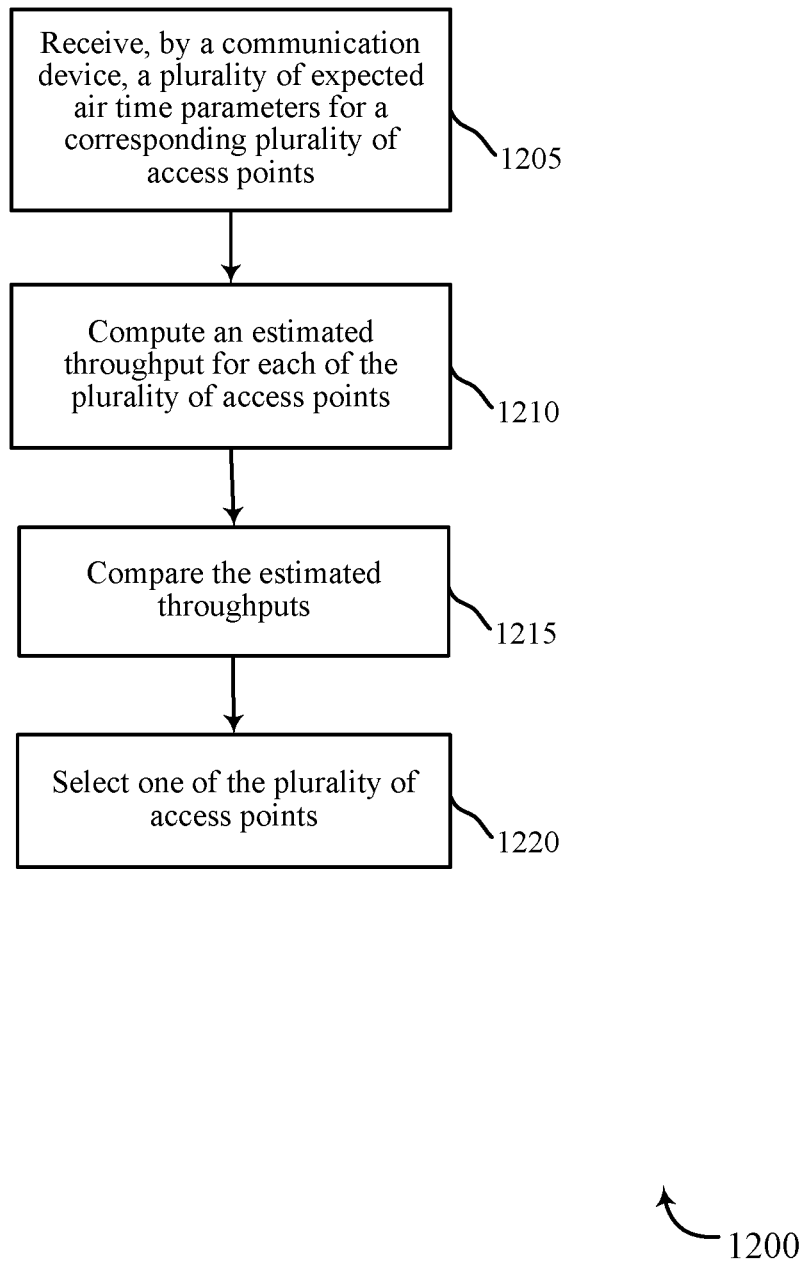
FIG. 12 is a flowchart illustrating another example of a method for wireless communication, in accordance with various aspects of the present disclosure.

FIG. 12 is a flowchart illustrating another example of a method 1200 for wireless communication, in accordance with various aspects of the present disclosure. As with the method 1100 described above, the method 1200 may be performed in accordance with aspects of the apparatus 701-*a*, 701-*b*, 701-*c*, 701-*d* described with reference to FIGS. 7A, 7B, 7C and 7D, or the STAs 115, 210, 310, 410 and 510 described with reference to FIGS. 1, 2, 3, 4 or 5. Such a STA or apparatus may execute sets of codes to control the functional elements of the STA or apparatus to perform the functions described below.

At block 1205, a wireless station (STA) may receive a plurality of expected air time parameters for a corresponding plurality of access points (APs). The expected air time parameters may be received via a broadcast wireless beacon or via a directed transmission from the corresponding APs.

At block 1210, the STA may compute or otherwise determine an estimated throughput for each of the plurality of APs based at least in part on the expected air time parameters. The STA may compare the estimated throughputs of the APs at block 1215, and then at block 1220, select one of the APs based at least in part on a result of the comparison. The selected AP then may be used for communications as described herein, such as by associating with the selected AP, roaming to the selected AP, or directing traffic (e.g., from a different network) to the selected AP.

Although the foregoing methods 1100 and 1200 are described in terms of the STA, it should be understood that a different communication device may perform such operations. For example, a cellular base station may receive the expected air time parameter(s) and make the determination/selection for a STA. Such an approach may provide for efficient transmission of the expected air time parameter(s) from the AP(s) and/or limit using power (e.g., battery) at the STA for receiving and processing the expected air time parameter(s).

Figure 13:
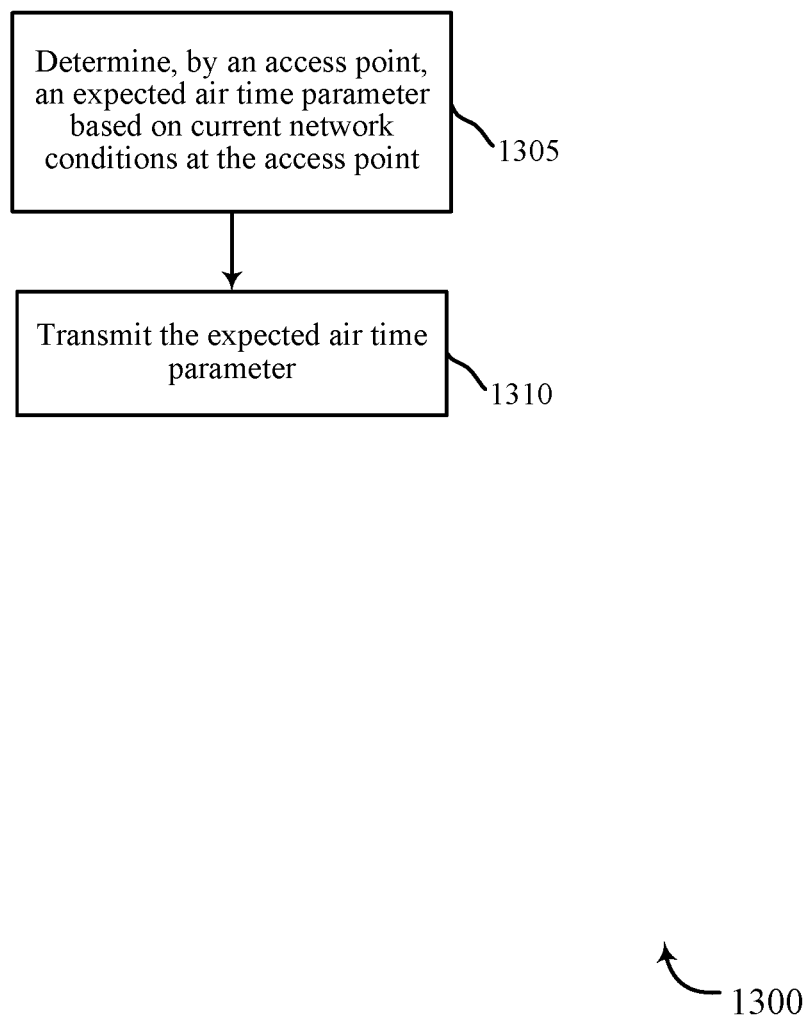
FIG. 13 is a flowchart illustrating yet another example of a method for wireless communication, in accordance with various aspects of the present disclosure.

FIG. 13 is a flowchart illustrating yet another example of a method 1300 for wireless communication, in accordance with various aspects of the present disclosure. The method 1300 may be performed in accordance with aspects of the APs 105, 205, 305, 405, 505 described with reference to FIGS. 1, 2, 3, 4 or 5, or the apparatus 801-*a*, 801-*b* described with reference to FIGS. 8A or 8B. Such an AP or apparatus may execute sets of codes to control the functional elements of the AP or apparatus to perform the functions described below.

At block 1305, the method may involve determining, by an access point (AP), an expected air time parameter based on current network conditions at the AP. Then, at block 1310, the expected air time parameter may be transmitted—either as a directed transmission to STA(s) or as a broadcasted wireless beacon to be received by STA(s) within range of the AP. In such a manner, the AP may provide the expected air time parameter to STA(s) to allow the STA(s) to determine whether to use the AP for communications.

Figure 14:
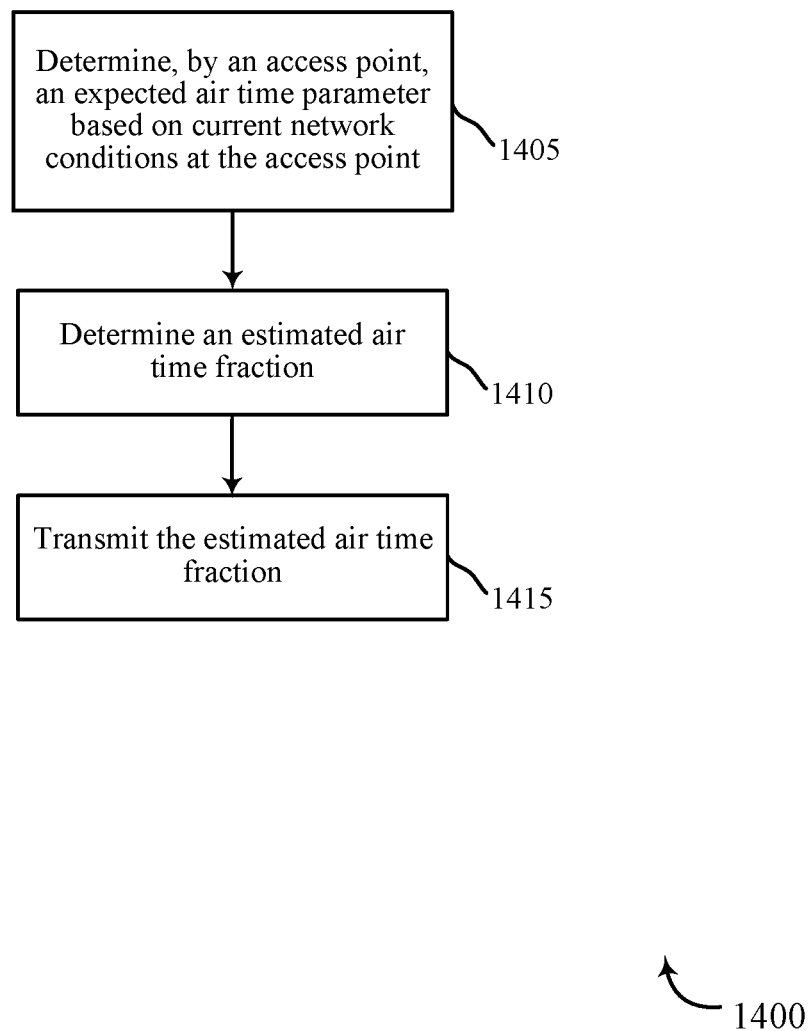
FIG. 14 is a flowchart illustrating still another example of a method for wireless communication, in accordance with various aspects of the present disclosure.

FIG. 14 is a flowchart illustrating still another example of a method 1400 for wireless communication, in accordance with various aspects of the present disclosure. As with the method 1300 described above, the method 1400 may be performed in accordance with aspects of the APs 105, 205, 305, 405, 505 described with reference to FIGS. 1, 2, 3, 4 or 5, or the apparatus 801-*a*, 801-*b* described with reference to FIGS. 8A or 8B. Such an AP or apparatus may execute sets of codes to control the functional elements of the AP or apparatus to perform the functions described below.

At block 1405, the method may involve determining, by an access point (AP), an expected air time parameter based on current network conditions at the access point. The AP may determine an estimated air time fraction, at block 1410, based at least in part on the expected air time parameter. Then, at block 1415, the estimated air time fraction may be transmitted—either as a directed transmission to STA(s) or as a broadcasted a wireless beacon to be received by STA(s) within range of the AP. In such a manner, the AP may provide the estimated air time fraction to STA(s) to allow the STA(s) to determine whether to use the AP for communications.

The detailed description set forth above in connection with the appended drawings describes examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components (or modules) described in connection with the disclosure herein, such as the communications manager 710, 710-*a*, 710-*b*, 710-*c*, 810, 810-*a*, 920, 1025, 1045, 1050, the air time fraction estimator 720, 825, the throughput estimator 725, 725-*a*, 725-*b*, the air time fraction/throughput estimator 925, the roaming manager 730, 935, the comparator 735, 750, 930, the AP selector 740, the RAT manager 745, the expected air time parameter estimator 820, and the expected air time parameter/air time fraction estimator 1030, may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein, but is to be accorded the widest scope consistent with the principles and novel features disclosed herein.

What is claimed is:

1. A method for wireless communications, comprising:
   receiving, by a wireless station prior to establishing a communication link with an access point, an expected air time parameter from the access point, wherein the expected air time parameter is indicative of an estimated air time fraction obtainable by the wireless station for communications associated with a particular access class (AC) between the wireless station and the access point;
   estimating, by the wireless station prior to establishing the communication link, a throughput for communications with the access point based at least in part on the received expected air time parameter; and
   determining, by the wireless station prior to establishing the communication link, whether to use the access point for communications based at least in part on the estimated throughput.

2. The method of claim 1, wherein determining whether to use the access point comprises:
   determining, based at least in part on the expected air time parameter, whether to perform an action from a group consisting of: triggering association with the access point, triggering roaming to the access point, and triggering steering of traffic to the access point.

3. The method of claim 1, wherein receiving the expected air time parameter for the access point comprises:
   receiving a wireless beacon broadcast by the access point, the wireless beacon comprising the expected air time parameter.

4. The method of claim 3, further comprising:
   transmitting the expected air time parameter to a node other than the access point.

5. The method of claim 3, wherein determining whether to use the access point comprises:
   determining, based at least in part on the expected air time parameter, whether to use the access point for communications between the wireless station and the access point.

6. The method of claim 3, wherein the expected air time parameter is located in an estimated service parameters portion of the wireless beacon.

7. The method of claim 1, further comprising:
   determining, based at least in part on the expected air time parameter, the estimated air time fraction obtainable for communications using the access point.

8. The method of claim 7, wherein the expected air time parameter comprises at least one parameter from a group consisting of:
   a number of stations actively being serviced by the access point, an average channel access latency, and a physical protocol data unit transmission time.

9. The method of claim 1, wherein determining whether to use the access point comprises:
   determining whether to steer traffic to a first network comprising the access point from a second network.

10. The method of claim 1, wherein
    receiving the expected air time parameter for the access point comprises receiving a plurality of expected air time parameters for a corresponding plurality of access points; and
    wherein determining whether to use the access point comprises selecting one of the plurality of access points based at least in part on the expected air time parameters for the plurality of access points.

11. The method of claim 10, further comprising:
    determining an estimated throughput for each of the plurality of access points; and
    comparing the estimated throughputs of the plurality of access points;
    wherein selecting one of the plurality of access points is based at least in part on a result of the comparing.

12. The method of claim 10, wherein selecting one of the plurality of access points for association is performed as part of a roaming operation.

13. A wireless station for wireless communications, comprising:
   a receiver to receive, prior to establishing a communication link with an access point, an expected air time parameter from the access point, wherein the expected air time parameter is indicative of an estimated air time fraction obtainable by the wireless station for communications associated with a particular access class (AC) between the wireless station and the access point;
   a processor; and
   memory storing computer-executable code for wireless communication, the code executable by the processor to:
   estimate, prior to establishing the communication link, a throughput for communications with the access point based at least in part on the expected air time parameter, and
   determine, prior to establishing the communication link, whether to use the access point for communications based at least in part on the estimated throughput.

14. The wireless station of claim 13, wherein the code is executable by the processor to determine whether to use the access point by:
   determining, based at least in part on the expected air time parameter, whether to perform an action from a group consisting of: triggering association with the access point, triggering roaming to the access point, and triggering steering of traffic to the access point.

15. The wireless station of claim 13, wherein the receiver is to receive a wireless beacon broadcast by the access point, the wireless beacon comprising the expected air time parameter.

16. The wireless station of claim 15, wherein the expected air time parameter is located in an estimated service parameters portion of the wireless beacon.

17. The wireless station of claim 13, wherein the code is executable by the processor to:
   determine, based at least in part on the expected air time parameter, the estimated air time fraction obtainable for communications using the access point.

18. A non-transitory computer-readable medium storing computer-executable code for wireless communication, the code executable by a processor to cause a device to:
   receive, by a wireless station prior to establishing a communication link with an access point, an expected air time parameter from the access point, wherein the expected air time parameter is indicative of an estimated air time fraction obtainable by the wireless station for communications associated with a particular access class (AC) between the wireless station and the access point;
   estimate, by the wireless station prior to establishing the communication link, a throughput for communications with the access point based at least in part on the expected air time parameter; and
   determine, by the wireless station and prior to establishing the communication link, whether to use the access point for communications based at least in part on the estimated throughput.

19. The non-transitory computer-readable medium of claim 18, wherein determining whether to use the access point comprises:
   determining, based at least in part on the expected air time parameter, whether to perform an action from a group consisting of: triggering association with the access point, triggering roaming to the access point, and triggering steering of traffic to the access point.

20. The non-transitory computer-readable medium of claim 18, wherein receiving the expected air time parameter for the access point comprises:
   receiving a wireless beacon broadcast by the access point, the wireless beacon comprising the expected air time parameter.

* * * * *